United States Patent
Noritomi et al.

(10) Patent No.: US 8,580,165 B2
(45) Date of Patent: Nov. 12, 2013

(54) METHOD FOR MANUFACTURING MULTIPLE-PHASE PARTICLE AND APPARATUS FOR MANUFACTURING MULTIPLE-PHASE PARTICLE

(75) Inventors: Yasuko Noritomi, Kawasaki (JP); Hidetaka Noritomi, Kawasaki (JP); Yuuji Kubota, Yokohama (JP); Takahiro Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1476 days.

(21) Appl. No.: 11/230,630

(22) Filed: Sep. 21, 2005

(65) Prior Publication Data

US 2006/0220269 A1 Oct. 5, 2006

(30) Foreign Application Priority Data

Mar. 29, 2005 (JP) ................................ 2005-096550

(51) Int. Cl.
*B01J 13/04* (2006.01)

(52) U.S. Cl.
USPC ............................................................. 264/4.1

(58) Field of Classification Search
USPC ............ 428/402–402.24; 427/213.3–213.36; 264/4–4.7
See application file for complete search history.

(56) References Cited

U.S. PATENT DOCUMENTS

| | | | |
|---|---|---|---|
| 5,260,067 A * | 11/1993 | Zheng | 424/450 |
| 5,326,484 A | 7/1994 | Nakashima et al. | |
| 5,510,247 A * | 4/1996 | Komives et al. | 435/41 |
| 6,438,279 B1 * | 8/2002 | Craighead et al. | 385/12 |
| 7,268,167 B2 * | 9/2007 | Higuchi et al. | 516/9 |
| 2009/0131543 A1 * | 5/2009 | Weitz et al. | 516/54 |

FOREIGN PATENT DOCUMENTS

| | | |
|---|---|---|
| JP | 2733729 | 1/1998 |
| JP | 2003-71261 | 3/2003 |
| JP | 2003-164754 | 6/2003 |
| JP | 2004-12402 | 1/2004 |

OTHER PUBLICATIONS

U.S. Appl. No. 11/687,995, filed Mar. 19, 2007, Noritomi, et al.
Japanese Analytical Instrumentation Exhibition in 2004; The Research Association of Micro Chemical Process Technology.

* cited by examiner

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

Disclosed is a method of manufacturing a multiple-phase particle comprising preparing a channel whose outlet port is adapted to a first fluid, feeding a second fluid into the channel, the second fluid being higher in affinity to the outlet port as compared with the first fluid, feeding a third fluid into the channel, the third fluid being lower in affinity to the outlet port as compared with the second fluid, and introducing the third fluid into the second fluid in the channel while retaining the second fluid at the outlet port by an effect of the affinity of the second fluid, thereby entrapping the third fluid in the second fluid to form the multiple-phase particle.

17 Claims, 18 Drawing Sheets

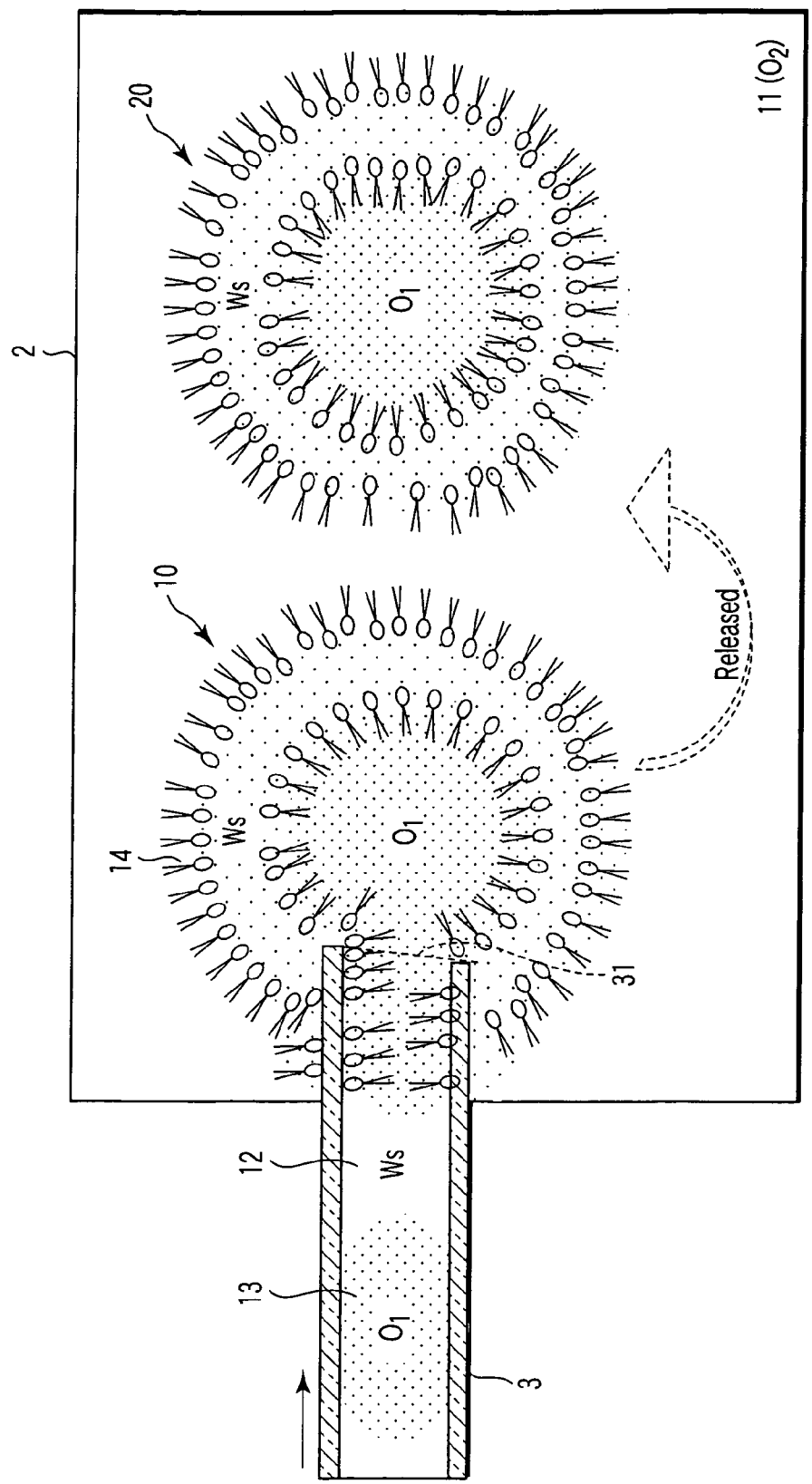
F I G. 5

300μm

300μm

300μm

300μm

300μm

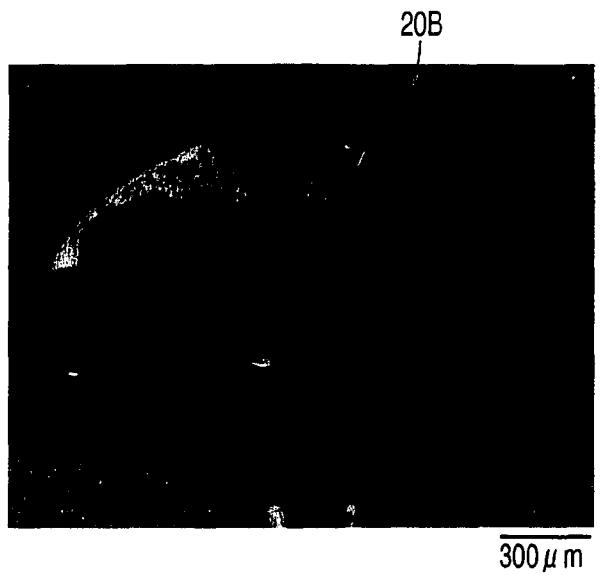
F I G. 15
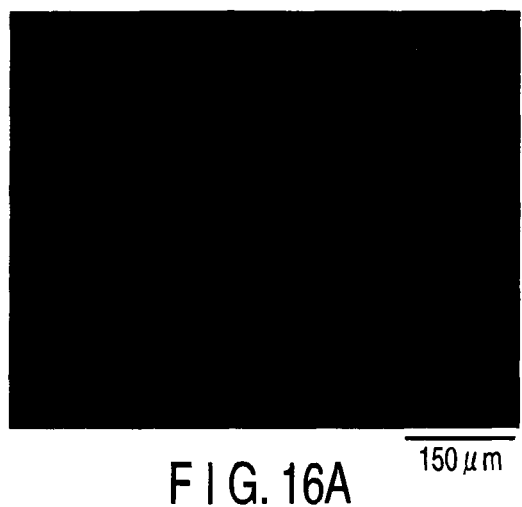
F I G. 16A
F I G. 16B
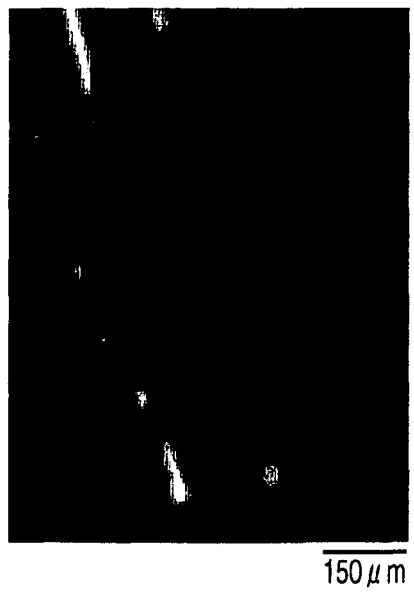
F I G. 16C

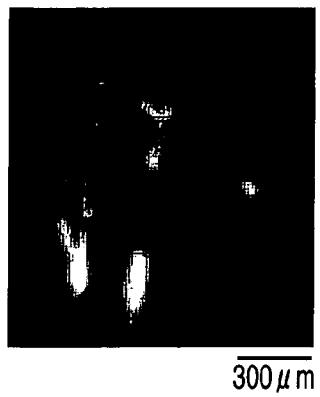
300μm
FIG. 17A
300μm
FIG. 17B
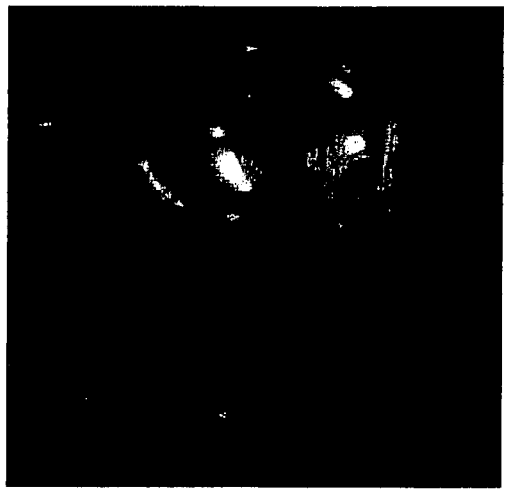
300μm
FIG. 17C
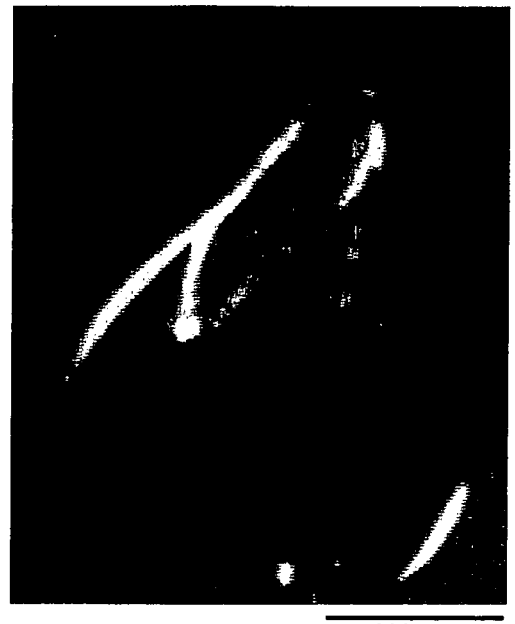
300μm
FIG. 18A
FIG. 18B  300μm

METHOD FOR MANUFACTURING MULTIPLE-PHASE PARTICLE AND APPARATUS FOR MANUFACTURING MULTIPLE-PHASE PARTICLE

CROSS-REFERENCE TO RELATED APPLICATIONS

This application is based upon and claims the benefit of priority from prior Japanese Patent Application No. 2005-096550, filed Mar. 29, 2005, the entire contents of which are incorporated herein by reference.

BACKGROUND OF THE INVENTION

1. Field of the Invention

This invention relates to a method for manufacturing a multiple-phase particle and to an apparatus for manufacturing the multiple-phase particle.

2. Description of the Related Art

Multiple-phase particles such as microcapsules and composite fine particles are used extensively in various technical fields including biotechnology, the drug industry, the food industry, the cosmetic industry, and the paint industry, etc. When a multiple-phase particle is manufactured using lipid as an emulsifier, the product is referred to as a lipid multiple-phase particle. Further, the multiple-phase particle can be classified, according to the thickness of the membrane thereof, into a double emulsion and a vesicle (a reversed vesicle). Depending on the number of inner gas phase, aqueous phase or oil phase, the double emulsion can be classified into a multiple-phase-type emulsion and a single-phase-type emulsion.

In the DDS (Drug Delivery System) where the enhancement of pharmacological effects and the suppression of side effects are aimed at, the lipid multiple-phase particle is advantageous in that it is capable of controlling the release of medicine, improving the absorbability and enhancing the target directivity, and is also more excellent as compared with polymeric carrier in terms of toxity, antigenicity, irritation, etc. However, since the lipid multiple-phase particle is relatively instable as compared with polymeric carrier, it is difficult to supply a sufficient quantity as required of the particle immediately when immediate supply thereof is needed.

Although it is relatively easy to manufacture a multiple inner aqueous phase type emulsion, the double emulsion to be obtained lacks uniformity of particle size. Therefore, when the lipid multiple-phase particle is to be employed as a microcarrier, there will be raised the problems that it is difficult to control the dosage of chemicals as well as the rate of releasing the chemicals.

In order to manufacture a vesicle which is excellent in uniformity of particle size, it will be required to undergo a series of complicated steps such as drying of lipid, stirring, ultrasonic treatment, pressing, etc. Since the manufacturing process thereof includes the employment of harmful volatile organic substance such as chloroform, it is difficult to directly entrap a bioactive substance in the vesicle. Further, it is difficult to quickly and automatically manufacture a vesicle excellent in uniformity of particle size and to manufacture a vesicle enclosing therein a bioactive substance. It is also difficult to manufacture a vesicle where the inner membrane and the outer membrane thereof are asymmetric. Moreover, since the particle diameter of vesicle to be manufactured is as small as about 20 nm-50 nm, it is difficult to entrap a sufficient quantity, per unit volume, of a high-molecular substance such as protein, DNA, RNA, etc., so as to secure high activity thereof.

BRIEF SUMMARY OF THE INVENTION

A method of manufacturing a multiple-phase particle according to one aspect of the present invention comprises preparing a channel whose outlet port is adapted to a first fluid; feeding a second fluid into the channel, the second fluid being higher in affinity to the outlet port as compared with the first fluid; feeding a third fluid into the channel, the third fluid being lower in affinity to the outlet port as compared with the second fluid; and introducing the third fluid into the second fluid in the channel while retaining the second fluid at the outlet port by an effect of the affinity of the second fluid, thereby entrapping the third fluid in the second fluid to form the multiple-phase particle.

An apparatus for manufacturing a multiple-phase particle according to another aspect of the present invention comprises a continuous-phase supply portion feeding a first fluid as a mobile phase or a stationary phase; a channel communicated via an outlet port with the continuous-phase supply portion; a second fluid supply portion feeding the second fluid to the channel; and a third fluid supply portion feeding the third fluid to the channel.

BRIEF DESCRIPTION OF THE SEVERAL VIEWS OF THE DRAWING

FIG. 5 is a diagram for illustrating a single-step emulsification method for forming an oil-in-water-in-oil (O/W/O) emulsion of multiple-phase particle according to a first embodiment of the present invention;

FIG. 15 is a photograph illustrating Example 5 of the first embodiment of the present invention;

FIGS. 16A to 16C are photographs illustrating Example 6 of the first embodiment of the present invention;

FIGS. 17A to 17C are photographs illustrating Example 7 of the first embodiment of the present invention;

FIGS. 18A and 18B are photographs illustrating Example 8 of the first embodiment of the present invention;

FIGS. 20A to 20F are diagrams each illustrating the configuration of the outlet port of the channel according to the second application example of the second embodiment of the present invention;

DETAILED DESCRIPTION OF THE INVENTION

Figure 1:
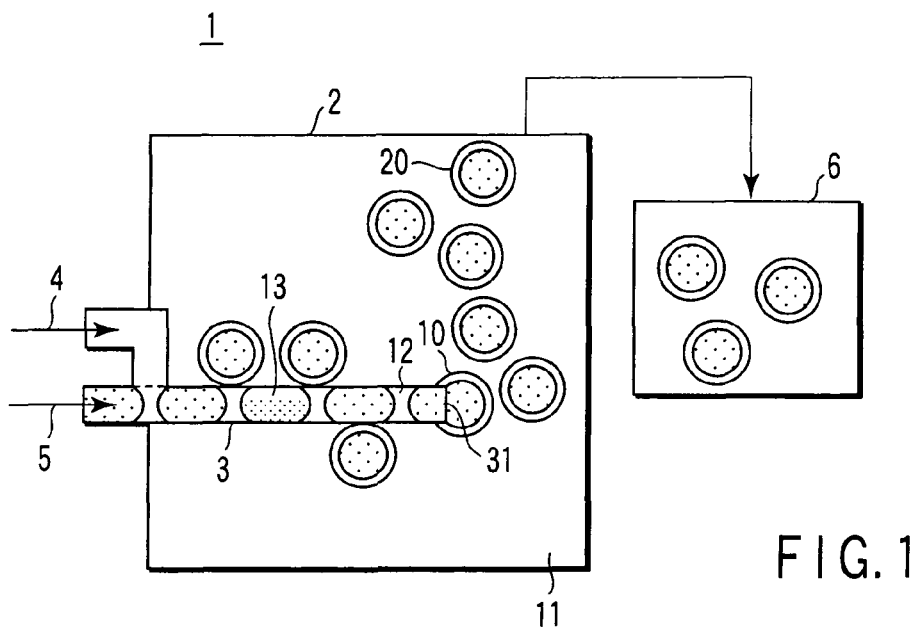
FIG. 1 is a diagram schematically illustrating the apparatus for manufacturing a multiple-phase particle according to a first embodiment of the present invention.

Next, various embodiments of the present invention will be illustrated in detail with reference to drawings. In these drawings, the same or similar components are referred to by the same or similar reference numerals. It should be noted however that since these drawings are depicted schematically, the proportions in dimension of parts or components may differ from actual ones. Therefore, specific dimensions of each of parts or components should be judged by referring to the following explanations. Further, even between or among FIGS, the dimensional relationships or proportions thereof may differ from each other.

First Embodiment

In this first embodiment of the present invention, there are explained a method as well as an apparatus for manufacturing multiple-phase particles of various states such as a single inner aqueous phase type water-in-oil-in-water (W/O/W) emulsion, a multiple inner aqueous phase type water-in-oil-in-water (W/O/W) emulsion, vesicle, liposome, a single inner oil phase type oil-in-water-in-oil (O/w/O) emulsion, a multiple inner oil phase type oil-in-water-in-oil (O/W/O) emulsion, reversed vesicle, a single inner vapor phase type vapor-in-water-in-oil (V/W/O) emulsion, a multiple inner vapor phase type vapor-in-water-in-oil (V/W/O) emulsion, a single inner vapor phase type vapor-in-oil-in-water (V/O/W) emulsion, a multiple inner vapor phase type vapor-in-oil-in-water (V/O/W) emulsion, etc.

FIG. 1 shows an apparatus for manufacturing a multiple-phase particle 20 according to a first embodiment of the present invention. The manufacturing apparatus 1 shown herein comprises a continuous-phase supply portion 2, a channel 3 communicating via an outlet port 31 with the continuous-phase supply portion 2, a second fluid supply portion 4, and a third fluid supply portion 5. The continuous-phase supply portion 2 feeds a first fluid 11 as a continuous-phase constituted by either a mobile phase or a stationary phase. The second fluid supply portion 4 feeds a second fluid 12 containing an emulsifier 14 to the channel 3. The affinity between this emulsifier 14 and the outlet port 31 is stronger than the affinity between the outlet port 31 and the first fluid 11.

The third fluid supply portion 5 feeds a third fluid 13 to the channel 3. The affinity between the third fluid 13 and the outlet port 31 is weaker than the affinity between the outlet port 31 and the second fluid 12 containing the emulsifier 14. Further, the manufacturing apparatus 1 comprises a recovering portion 6 for recovering a multiple-phase particle 20 that has been generated as it is pushed into the continuous-phase supply portion 2.

The manufacturing apparatus shown in FIG. 1 is designed such that the second fluid 12 containing an emulsifier (for example, the reference number 14 shown in FIG. 4) and being supplied from the second fluid supply portion 4, and the third fluid 13 being supplied from the third fluid supply portion 5 are fed alternately to the channel 3. At the outlet port 31, while the third fluid 13 is enclosed by the second fluid 12, the second fluid 12 is pushed into the first fluid 11, thereby producing an intermediate body 10 of the multiple-phase particle 20. From this intermediate body 10, it is possible to manufacture the multiple-phase particle 20 wherein the third fluid is entrapped in the second fluid.

The second fluid 12 contains at least one emulsifier 14. The second fluid 12 containing this emulsifier 14 is enabled, owing to the affinity thereof, to adhere to the outlet port 31. When the third fluid 13 is enclosed in the second fluid 12, the second fluid 12 is enabled to act as a boundary film between the third fluid 13 and the first fluid 11. As a result, it is possible to produce the intermediate body 10 where the second fluid 12 enclosing the third fluid 3 therein is enabled to act as a boundary film. When the introduction of the third fluid 13 into the second fluid 12 is terminated, the intermediate body 10 can be kept in a stable state as it is.

Further, when the third fluid 13 is continuously introduced into the second fluid 12, the intermediate body 10 is expanded to form a semi-spherical or micro-spherical body having a larger diameter than the inner diameter of the outlet port 31, thus ultimately making it possible to produce a single phase type multiple-phase particle 20 where the third fluid is entrapped in the second fluid. The multiple-phase particle 20 thus formed may be a single inner vapor phase type, aqueous phase type or oil phase type liquid membrane emulsion (Double emulsion), vesicle or reversed vesicle. This multiple-phase particle 20 is then released from the outlet port 31, resisting to the affinity thereof to the outlet port 31.

When the first fluid (continuous-phase) 11 retained in the continuous-phase supply portion 2 is a mobile phase, the multiple-phase particle 20 flows in the flow direction of the first fluid 11 and is recovered at the recovering portion 6. When the first fluid 11 is a stationary phase, the multiple-phase particle 20 that has been pushed out from the outlet port 31 can be unidirectionally adhered to the outer surface of the channel 3 by securing a suitable degree of affinity between the multiple-phase particle 20 and the outer surface of the channel 3. Alternatively, the multiple-phase particle 20 can be adhered onto the outer surface of the channel 3 in such a manner that the multiple-phase particle 20 is arrayed regularly or irregularly.

Figure 2:
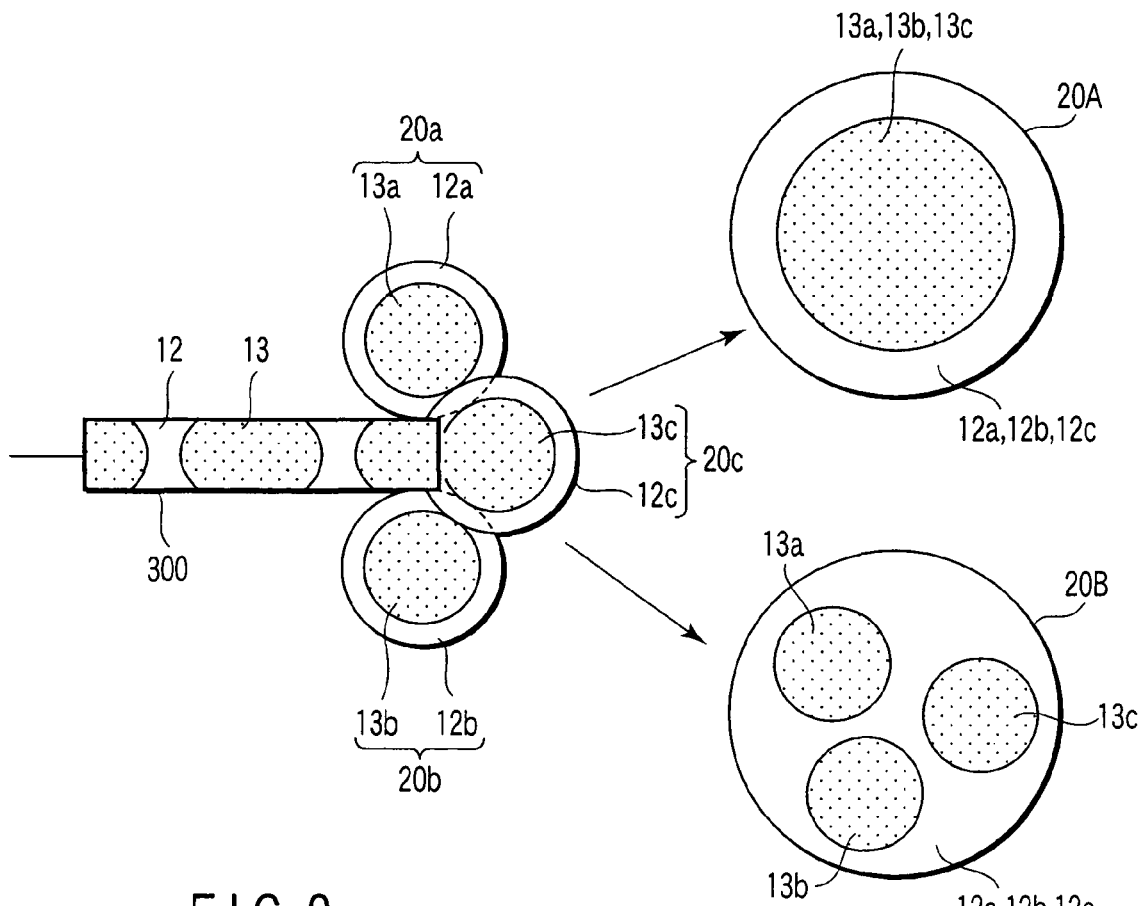
FIG. 2 is a diagram illustrating the process of forming a multiple-phase particle according to a first embodiment of the present invention.

FIG. 2 shows the process of forming a multiple-phase particle according to a first embodiment of the present invention. As shown in FIG. 2, by using the second fluid 12a containing an emulsifier 14 which has been fed initially and the third fluid 13a, a multiple-phase particle 20a is formed at the outlet port 31. Before this multiple-phase particle 20a is completely separated from the outlet port 31, the second fluid 12b containing the emulsifier 14 is again fed to the multiple-phase particle 20a. By using the second fluid 12b and the third fluid 13b, a multiple-phase particle 20b is formed. Then, by using the second fluid 12c containing the emulsifier 14 and the third fluid 13c, a multiple-phase particle 20c is formed. In this case, it is possible to form a single phase type multiple-phase particle 20A wherein the third fluids 13a, 13b and 13c which have been coalesced into one body are enclosed in the second fluids 12a, 12b and 12c containing a coalesced emulsifier 14 and coalesced into one body. The multiple-phase particle formed in this case can be referred to as a single phase type emulsion, vesicle or reversed vesicle.

Alternatively, it is possible to manufacture a multiple-phase type multiple-phase particle 20B wherein the third fluids 13a, 13b and 13c are independently dispersed in a coalesced body of the second fluids 12a, 12b and 12c. The multiple-phase particle in this case is a multiple-phase type emulsion.

Figure 3:
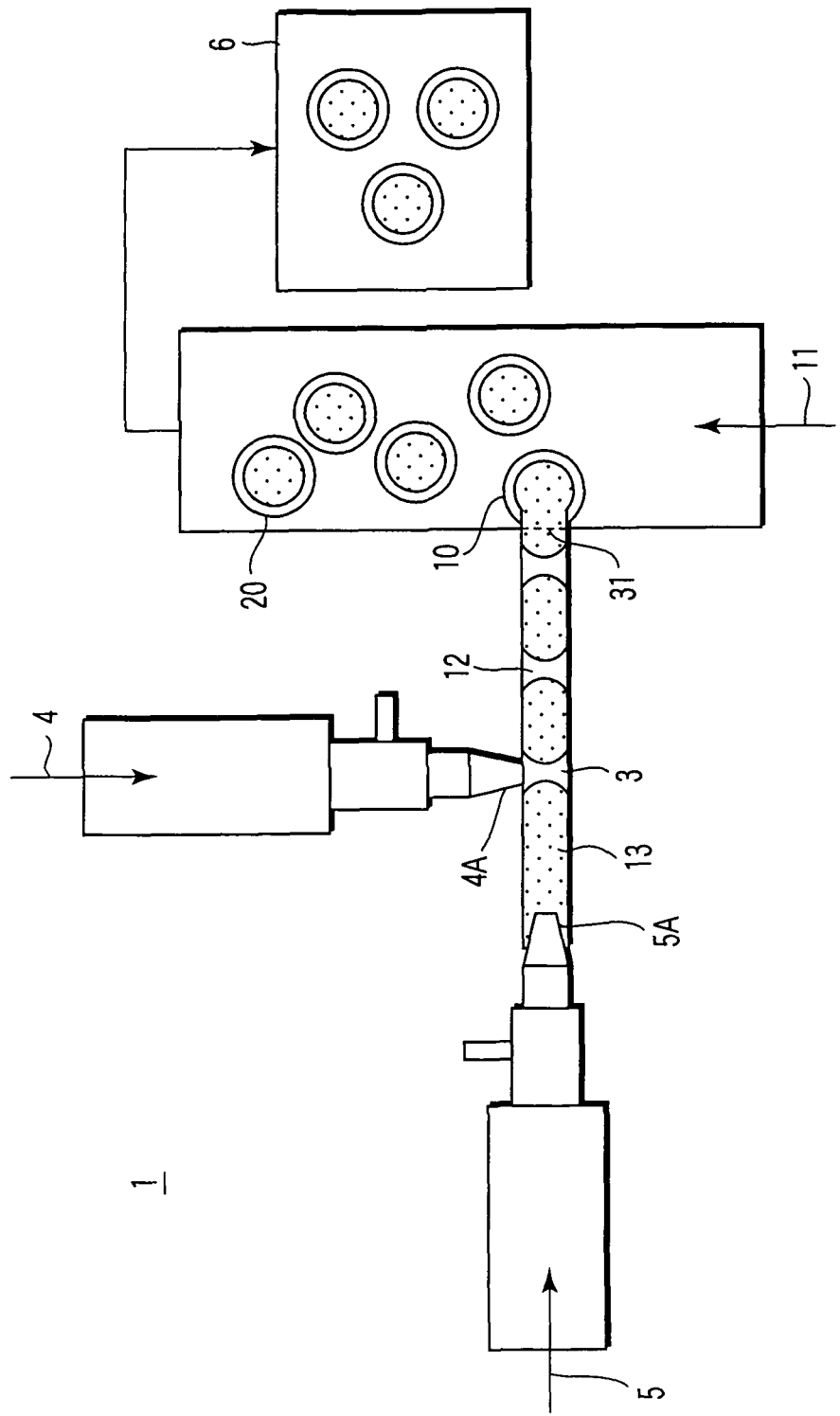
FIG. 3 is a diagram illustrating a full automatic manufacturing apparatus for a multiple-phase particle according to a first embodiment of the present invention.

In order to introduce the second fluid 12 and the third fluid 13 into the channel 3, it is possible to employ a method such as a direct introduction method or a suction method. One example of the direct introduction method is shown in FIG. 3. As shown in FIG. 3, the second fluid 12 is fed from the second fluid supply portion 4 via an inlet port 4A into the channel 3 and the third fluid 13 is fed from the third fluid supply portion 5 via the inlet port 5A into the channel 3. The second fluid 12 and the third fluid 13 are alternately fed into the channel 3. For example, while a segment of the second fluid 12 is intermittently fed at a constant intervals into the channel 3, a segment of the third fluid 13 is fed into the channel 3 concurrent with the supply of the second fluid 12. It is possible, in this manner, to alternately feed the second fluid 12 and the third fluid 13 into the channel 3. Alternatively, while the third fluid 13 is continuously fed into the channel 3, a segment of the second fluid is intermittently squeezed into the continuous flow of the third fluid 13 at a constant interval. It is possible, in this manner, to alternately feed the second fluid 12 and the third fluid 13 into the channel 3.

In order to alternately feed the second fluid 12 and the third fluid 13 into the channel 3, it is possible to employ a fluid-switch provided with a fluid supply control valve and a valve controlling apparatus for controlling the control valve. According to the direct introduction method, it is possible to continuously and fully automatically manufacture the multiple-phase particle while both of the second fluid 12 and the third fluid 13 feed directly into the channel 3. Therefore, this method is advantageous in the respect that the multiple-phase particle 20 can be mass-produced. Further, when the first fluid 11 is a mobile phase, the multiple-phase particle 20 manufactured can be easily recovered at the recovery portion 6.

On the other hand, the suction method is a method for alternately sucking the second fluid 12 and the third fluid 13 into the channel 3 from the outlet port 31 of the channel 3. In this suction method, the second fluid 12 and the third fluid 13 are separately sucked into the channel 3 from the same outlet port 31. Therefore, it is possible to realize miniaturization of the apparatus. Further, it is now possible to easily supply a required quantity of the multiple-phase particle 20 to a location where the supply of the multiple-phase particle 20 is needed such as a syringe.

At least the outlet port 31 of the channel 3 is made from a material to which the second fluid can be adhered due to the affinity of the material to the second fluid 12. The surface characteristics, especially wettability thereof, can be relatively determined by taking into consideration the features of the emulsifier 14 included in the second fluid 12 and the features of the third fluid 13. Incidentally, it is also possible to control the surface characteristics of the outlet port 31 by treating the surface of the outlet port 31. For example, it is possible to enhance the wettability of the outlet port 31 to the second fluid 12 (or adhesion of the second fluid 12) by performing a roughening treatment of the surface of the outlet port 31.

Figure 4:
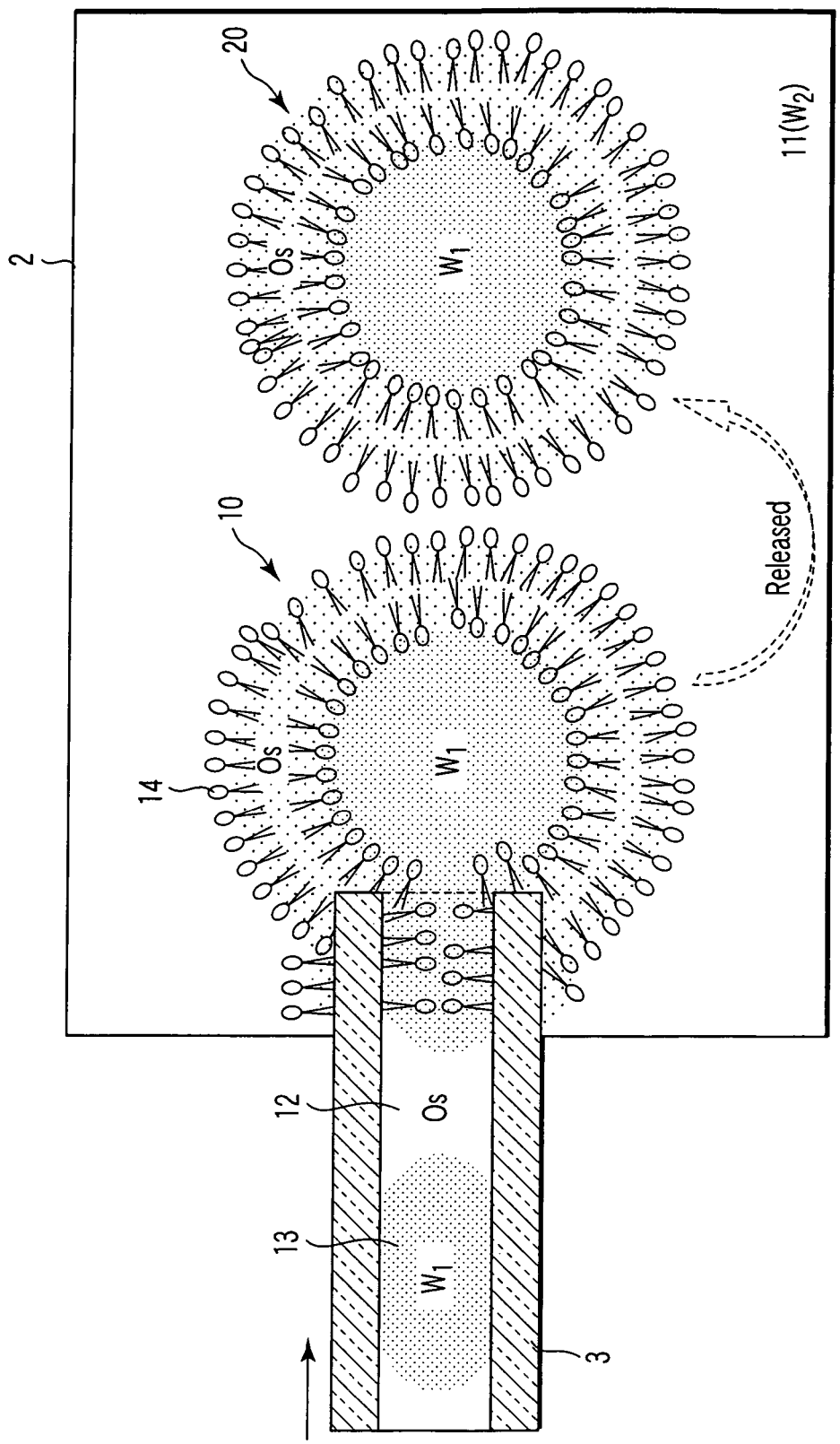
FIG. 4 is a diagram for illustrating a single-step emulsification method for forming a water-in-oil-in-water (W/O/W) emulsion of multiple-phase particle according to a first embodiment of the present invention.

Next, the single-step emulsifying method of the multiple-phase particle of W/O/W emulsion according to the first embodiment will be explained with reference to FIG. 4. For example, the outlet port 31 of channel (for example, micro-channel) 3 is made hydrophobic. By using an aqueous phase ($W_2$) as the first fluid 11 and by using an oil phase (Os) containing an emulsifier 14 as a segment of the second fluid 12, these fluids are fed into the channel 3. Further, by using an aqueous phase ($W_1$) as a segment of the third fluid 13, segments of both second fluid 12 and third fluid 13 are alternately fed into the channel 3. The second fluid 12 and the third fluid 13 introduced into the flow of the second fluid 12 are successively pushed into the first fluid 11 from the outlet port 31. As a result, an intermediate body 10 and a multiple-phase particle 20 of single inner aqueous phase type $W_1/Os/W_2$ emulsion or vesicle where the third fluid is to be enclosed in the second fluid can be manufactured. In this case, by a hydrophobic interaction between the hydrophobic group of the second fluid 12 or the emulsifier 14 and the hydrophobic channel 3, the second fluid 12 containing an emulsifier 14 adhere onto the outlet port 31.

At the interface where the emulsifier 14 and the third fluid 13 are contacted with each other, the hydrophilic group of the emulsifier 14 is arrayed so as to surround the third fluid 13. Further, at the interface where the emulsifier 14 and the first fluid 11 contact each other, the hydrophilic group of the emulsifier 14 is arrayed so as to face the first fluid 11. As the third fluid 13 is gradually introduced into the second fluid 12, a semi-spherical or microspherical body with the emulsifier 14 acting as a boundary film can be obtained. When these semi-spherical and microspherical bodies are grown into a size which is large enough for releasing, the resultant body is released from the outlet port 31, thereby manufacturing the multiple-phase particle 20 of single inner aqueous phase type $W_1/Os/W_2$ emulsion.

By the same principle, an intermediate body 10 as well as a multiple-phase particle 20 of a single inner vapor phase type $V/Os/W_2$ emulsion where the third fluid is enclosed in the second fluid can be manufactured. In this case, an oil phase (Os) containing an emulsifier 14 is fed, as a segment of the second fluid 12, into the channel 3 and a vapor phase (V) is fed, as a segment of the third fluid 13, into the channel 3. The segments of these second fluid 12 and third fluid 13 are alternately introduced into the channel 3. The second fluid 12 and the third fluid 13 introduced into the flow of the second fluid 12 are successively pushed into the first fluid 11 from the outlet port 31. As a result, an intermediate body 10 as well as a multiple-phase particle 20 of a single inner vapor phase type $V/Os/W_2$ emulsion can be manufactured.

By a hydrophobic interaction between the hydrophobic group of the second fluid 12 or the emulsifier 14 and the hydrophobic channel 3, the second fluid 12 adhere onto the outlet port 31. In the case of the single inner vapor phase type $V/Os/W_2$ emulsion, the hydrophobic group of emulsifier 14 is arrayed so as to face the third fluid 13 at the interface where the emulsifier 14 and the third fluid 13 contact each other. At the interface where the emulsifier 14 and the first fluid 11 contact each other, the hydrophobic group of emulsifier 14 is arrayed so as to face the first fluid 11.

Next, the single-step emulsifying method of the multiple-phase particle of O/W/O emulsion according to the first embodiment will be explained with reference to FIG. 5. The outlet port 31 of channel 3 is made hydrophilic. By using an oil phase ($O_2$) as the first fluid 11 and by using an aqueous phase (Ws) containing an emulsifier 14 as a segment of the second fluid 12, these fluids are fed into the channel 3. Further, by using an oil phase ($O_1$) as a segment of the third fluid 13, segments of both second fluid 12 and third fluid 13 are alternately fed into the channel 3. The second fluid 12 and the third fluid 13 introduced into the flow of the second fluid 12 are successively pushed into the first fluid 11 from the outlet port 31. As a result, an intermediate body 10 and a multiple-phase particle 20 of single inner oil phase type $O_1/W_s/O_2$ emulsion and reversed vesicle where the third fluid is enclosed in the second fluid can be manufactured.

In this case, by a hydrophilic interaction between the hydrophilic group of the second fluid 12 or the emulsifier 14 and the hydrophilic channel 3, the second fluid 12 adhere onto the outlet port 31. At the interface where the emulsifier 14 and the third fluid 13 contact each other, the hydrophobic group of the emulsifier 14 is arrayed so as to surround the third fluid 13. Further, at the interface where the emulsifier 14 and the first fluid 11 are contacted with each other, the hydrophobic group of the emulsifier 14 is arrayed so as to face the first fluid 11. As the third fluid 13 is gradually introduced into the second fluid 12, a semi-spherical or microspherical expanded body with the emulsifier 14 being acting as a boundary film can be obtained. When these semi-spherical and microspherical bodies are further grown into a size which is large enough for releasing, the resultant body is released from the outlet port 31, thereby manufacturing the multiple-phase particle 20 of single inner oil phase type $O_1/Ws/O_2$ emulsion.

By the same principle, an intermediate body 10 as well as a multiple-phase particle 20 of a single inner vapor phase type $V/Ws/O_2$ emulsion can be manufactured. In this case, an aqueous phase (Ws) containing an emulsifier 14 is fed, as a segment of the second fluid 12, into the channel 3 and a vapor phase (V) is fed, as a segment of the third fluid 13, into the channel 3. The segments of these second fluid 12 and third fluid 13 are alternately introduced into the channel 3. Thereafter, the second fluid 12 and the third fluid 13 introduced into the flow of the second fluid 12 are successively pushed into the first fluid 11 from the outlet port 31. As a result, an intermediate body 10 as well as a multiple-phase particle 20 of a single inner vapor phase type $V/Ws/O_2$ emulsion can be manufactured.

In the manufacture of the multiple-phase particle 20 according to the first embodiment of the present invention, the control of temperature and pressure is very important. In the case of controlling the temperature of manufacturing system, as long as it is possible to separately or totally control the temperature of the second fluid 12 containing an emulsifier as well as the temperature of the third fluid 13 directly or indirectly from the inside or outside of the channel 3, there is no particular limitation with regard to the means for controlling the temperature. Further, even in the continuous-phase supply portion 2, it is preferable to suitably control the temperature thereof.

In this first embodiment, the intermediate body 10 and the multiple-phase particle 20 can be manufactured so as to have a semi-ellipsoidal configuration or a spheroidal configuration depending on the molecular structure of emulsifier. Therefore, there is no particular limitation with regard to the configuration of the intermediate body 10 and the multiple-phase particle 20.

In the manufacture of the multiple-phase particle 20 according to this first embodiment, each of the first fluid 11, the second fluid 12 containing an emulsifier 14, and the third fluid 13 may be any one of vapor phase (V), aqueous phase (W) and oil phase (O) depending on the kinds of the multiple-phase particle 20 desired to be obtained. For example, in order to manufacture a $W_1/Os/W_2$ emulsion as the multiple-phase particle 20, the first fluid 11 may be an aqueous phase ($W_2$), the second fluid 12 may be an oil phase (Os) containing an emulsifier, and the third fluid 13 may be an aqueous phase ($W_1$) containing a substance.

The first fluid 11 may comprise a surfactant a polymer or a saccharide in order to stabilize the multiple-phase particle 20. Further, as for the third fluid, it is possible to employ liquid crystal. The third fluid may not be restricted to a single phase but may be a multiple-phase wherein a vapor phase, a liquid phase or liquid crystal is suitably mixed therewith.

The second fluid 12 can be adhered to the outlet port 31 through an interaction between the channel 3 and the second fluid 12 containing an emulsifier 14. The second fluid 12 may not be restricted to either water or oil. As for water, it is possible to employ pure water (distilled water) or an aqueous solution containing various materials. As for oil, it is possible to employ hydrocarbons such as hexane, octane, isooctane, decane, dodecane, hexadecane, cyclohexane, etc.; a hydrophobic solvent such as chloroform, etc.; a hydrophilic solvent such as methanol, butanol, acetonitrile, etc.; and aromatic hydrocarbons such as benzene, toluene, etc. These solvents can be employed singly or as a mixture. Further, in order to dissolve a water-soluble living matter-related substance in the second fluid 12, a small quantity of water may be added to the second fluid 12. As long as the solvent or mixed solvent to be employed is capable of dissolving or dispersing the emulsifier 14, there is no limitation with regard to the kinds of solvent, mixing ratio and the state of mixture.

In the manufacture of multiple-phase particle (for example, double emulsion, vesicle, liposome, etc.) for DDS, non-toxic oil such as non-toxic glycerin, ethylene glycol, ethanol, soybean oil, etc. can be employed as an oil phase. As for the second fluid 12 containing an emulsifier 14, it may be constituted by only an emulsifier. For example, an emulsifier containing at least one material excluding water and oil may be employed as the second fluid. An emulsifier which is low in HLB value is high in affinity to oil and hence lipophilic. On the other hand, an emulsifier which is high in HLB value is highly hydrophilic.

As for the second fluid 12, it may be constituted by only an emulsifier. Therefore, a plural kinds of emulsifiers differing HLB value may be suitably mixed together to form a mixture of emulsifiers exhibiting a wide range of HLB values for use in the manufacture of a multiple-phase particle. For example, when sorbitan monolaurate and polyoxyethylene sorbitan monolaurate are mixed together at a suitable ratio, it is possible to obtain a mixture of emulsifiers exhibiting an HLB value ranging from 9 to 17. Further, when sorbitan monostearate and polyoxyethylene sorbitan monostearate, or sorbitan monooleate and polyoxyethylene sorbitan monooleate are mixed together at a suitable ratio, it is possible to obtain a mixture of emulsifiers exhibiting an HLB value ranging from 5 to 15. Further, when two different kinds of sucrose fatty acid esters are mixed together at a suitable ratio, it would be possible to obtain a mixture of emulsifiers exhibiting an HLB value ranging from 1 to 19.

A mixture of emulsifiers (the second fluid 12) retain at the outlet port 31 by the affinity thereof to the outlet port 31 of channel 3. When the mixture of emulsifiers is pushed into the first fluid 11 while introducing the third fluid 13 into the mixture of emulsifiers, an intermediate body 10 of multiple-phase particle 20 is produced. From this intermediate body 10, it is possible to manufacture the multiple-phase particle 20 wherein the third fluid is enclosed in the mixture of emulsifiers. This process can be achieved by using a mixture of emulsifiers exhibiting a suitable HLB value.

When a multiple-phase particle is manufactured using, as the second fluid 12, only an emulsifier or an emulsifier containing some kind of substance, multilamellar vesicle, multilamellar reversed vesicle, vesicle or reversed vesicle can be manufactured.

Since the emulsion is thermodynamically unstable, creaming, flocculation, Ostwald ripening or coalescence generates with time, thereby phase-separating the emulsion into an oil phase and an aqueous phase. According to the method according to one embodiment of the present invention, a multiple-phase particle can be manufactured by using only an emulsifier. As a result, it is now possible to manufacture thermodynamically stable multilamellar vesicle, multilamellar reversed vesicle, vesicle or reversed vesicle.

When water or oil is included in the second fluid 12 containing an emulsifier 14, the multiple-phase particle 20 to be formed initially is a double emulsion. When the membrane of the multiple-phase particle 20 becomes thinner subsequently, multilamellar vesicle, multilamellar reversed vesicle, vesicle or reversed vesicle can be formed.

The second fluid 12 containing an emulsifier 14 may further contain at least one material. Specific examples of such a material include, for example, protein (for example, enzyme, molecular chaperone, antigen, antibody, hormone, etc.), nucleic acid, nucleic acid-related substances, molecule, glycolipid, cholesterol, fluorescent pigment, ligand, photosensitive molecule, ion channel, electron-conjugated substance, supplemental surfactant, crown ether, fullerene, carbon nanotube, carbon nanohone, porphyrin, cyclodextrin, molecular tongs, microparticle, dendrimer, steroid, peptide, polypeptide and saccharide. It is possible, through the inclusion of these materials in the second fluid, to manufacture double emulsion, vesicle or reversed vesicle which are modified by these materials.

If double emulsion is to be manufactured, other kinds of substance may be dispersed or dissolved in the second fluid 12 in addition to the emulsifier 14 and the aforementioned materials. Specific examples of such a substance include, for example, redox agent, peptide, metallic fine particle, magnetic fine particle, polymeric fine particle, microparticle, dendrimer, carbon nanohone, oil-soluble or water-soluble medicine, etc. These substances may be employed singly or in combination of two or more kinds and may be dispersed or dissolved in the second fluid.

As long as it is possible to obtain stable multiple-phase particle 20, the emulsifier 14 to be included therein may be selected from lipid, boundary lipid, sphingolipid, fluorescent lipid, cationic surfactant, anionic surfactant, amphoteric surfactant, nonionic surfactant, synthetic polymer, natural polymer such as protein. As for the kinds and combination of the emulsifier 14, there is no particular limitation.

When a lipid is to be employed as the emulsifier 14, the following substances can be employed as lipid. Namely, they include triolein, monoolein, egg yolk lecithin, phospholipid, synthetic lipid, lysophospholipid, glycosyl diacyl glycerol, plasmalogen, sphingomyelin, ganglioside, fluorolipid, sphingolipid, sphingoglycolipid, steroid, sterol, cholesterol, oxicholesterol, dihydrocholesterol, glyceryl distearate, glyceryl monooleate, glyceryl dioleate, isosorbate monobrassidate, sorbitan tristearate, sorbitan monooleate, solbitan monopalmitate, sorbitan monolaurate, sorbitan monobrassidate, dodecyl phosphate, dioctadecyl phosphate, tocopherol, chlorophyll, xanthopyll, phosphatidylethanol amine, phosphatidylserine, inositol, hexadecyltrimethyl ammonium bromide, diglycosyl diglyceride, phosphatidylcholine, retinal/oxycholesterol/lectin/rhodopsin, cerebral total lipid, human erythrocyte total lipid, etc. Other kinds of lipid and synthetic lipid can be also used as long as they are useful in the manufacture of multiple-phase particle 20.

When a surfactant is to be employed as the emulsifier 14, the following substances can be employed as lipid. Namely, they include alkyl quaternary ammonium salt (such as CTAB, TOMAC, etc.), alkyl pyridinium salt (such as CPC, etc.), dialkyl sulfosuccinate (such as AOT, etc.), dialkyl phosphate, alkyl sulfate (such as SDS, etc.), alkyl sulfonate, polyoxyethyelene-based surfactant (such as Tween type, Brij type, Triton type, etc.), alkyl sorbitan (Span type, etc.), lecithin-based surfactant, betaine-based surfactant, sucrose fatty acid ester, etc. It is also possible to employ other kinds of surfactant other than mentioned above.

When a polymeric emulsifier is to be employed as the emulsifier 14, the following substances can be employed as lipid. Namely, they include polysoap, polyethylene glycol, polyvinyl alcohol, polypropylene glycol, etc.

When a protein emulsifier is to be employed as the emulsifier 14, casein can be employed for instance.

As long as it is possible to stably retain a multiple-phase particle, the third fluid 13 may be suitably selected so as to comprise water or oil as in the case of the second fluid 12 containing an emulsifier 14. It is also possible to employ gas or liquid crystal as the third fluid 13.

By incorporating various materials into each segment of the third fluid 13, double emulsion, vesicle or reversed vesicle each enclosing therein a foreign matter can be manufactured. Namely, it is possible to obtain double emulsion, vesicle or reversed vesicle, wherein the inner membrane and the outer membrane thereof are modified by a foreign matter. As for the material to be incorporated into the third fluid 13, it is possible to employ aromatic or odorous substances, drug, chemicals, dyestuffs, fluorescent agents, sugar, redox agents, peptide, polypeptide, protein, nucleic acid, nucleic acid-related substances, metallic fine particle, dendrimer, carbon nanohone, fine particle, micelle containing oil-soluble drug, reversed micelle containing water pool-soluble drug or protein, cell, liquid crystal, etc. Namely, it is possible to employ gas, liquid, solid, molecular assembly, etc. These materials can be employed singly or in combination thereof.

As for the first fluid 11, water or oil can be employed. Further, gas can be also employed as the first fluid 11. In order to enhance the stability of the multiple-phase particle 20, a surfactant, a polymer or sugar may be optionally incorporated into the first fluid 11.

In the manufacturing method of the multiple-phase particle 20 wherein the channel 3 is utilized according to the first embodiment of the present invention, it is desirable to suitably control the volume ratio between the second fluid 12 and the third fluid 13. By doing so, the film thickness and particle diameter of the multiple-phase particle 20 can be easily controlled. Further, it is also desirable to suitably select and control the diameter, configuration and surface characteristics of the outlet port 31 as well as the extrusion rate of fluids, the flowing rate and temperature of the first fluid 11, the kinds of emulsifier 14 to be included in the second fluid 12, and the kinds of solvent to be employed. When these factors are suitably controlled, it would become possible to quickly and automatically manufacture a multiple-phase particle 20 which is minimal in non-uniformity with regard to the particle diameter, configuration and film thickness.

In the manufacturing apparatus 1 of the multiple-phase particle 20 shown in FIG. 1, if the multiple-phase particle 20 is positively or negatively charged, the multiple-phase particle 20 can be easily recovered by using an electroosmosis flow. In this case, an electrode is disposed at the continuous-phase supply portion 2 or at the recovery portion 6. The same can be applied to the manufacturing apparatus shown in FIG. 3. When a nanoporous filter is disposed at the outlet port of channel, a multiple-phase particle which is much smaller in particle diameter can be obtained. For example, a hydrophilic nanoporous filter to be employed in the manufacture of a W/O/W double emulsion or multilamellar vesicle or in the manufacture of vesicle can be made to have a hydrophobic surface by surface-treating it by nonelectrolytic plating, etc.

First Application Example

Figure 6:
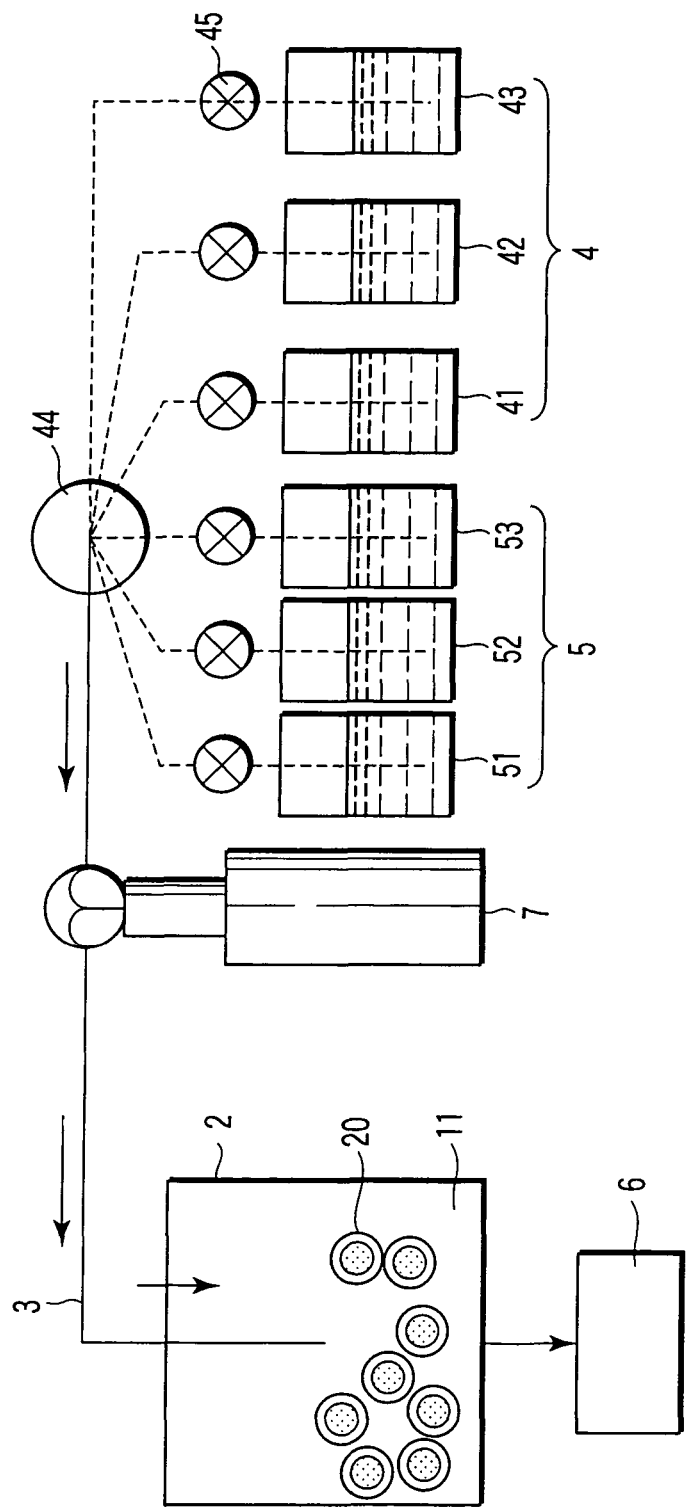
FIG. 6 is a diagram schematically illustrating the apparatus for manufacturing a multiple-phase particle according to a first application example of the first embodiment of the present invention.

The application of the present invention to the method of manufacturing different kinds of multiple-phase particles will be explained with reference to FIG. 6. FIG. 6 shows a schematic view of the manufacturing apparatus for manufacturing multiple-phase particles according to this first application example of the first embodiment.

The manufacturing apparatus 1 shown herein comprises a second fluid supply portion 4 having a plurality of supply portions 41-43 which are juxtaposed each other. The supply portions 41-43 are communicated via a supply-control valve 44 and on/off valves 45 with a channel 3. Further, the manufacturing apparatus 1 comprises a third fluid supply portion 5 having a plurality of supply portions 51-53 which are juxtaposed each other. The supply portions 51-53 are communicated via a supply-control valve 44 and on/off valves 45 with a channel 3. A pencil pump 7 is disposed in between the continuous-phase supply portion 2 and the supply-control valve 44.

In each of the supply portions 41-43 of the second fluid supply portion 4, a second fluid containing a different kind of emulsifier 14 is filled so as to be controlled by the on/off valves 45. In each of the supply portions 51-53 of the third fluid supply portion 5, a different kind of material is filled so that a third fluid containing a different kind of material can be fed into the channel 3. The supply of the third fluid can be controlled by using the supply-control valve 44 and the on/off valves 45.

In addition to the emulsifier 14, the second fluid may further contain a different kind of substance. Specific examples of such a substance include ligand, glycolipid, protein, electron-conjugated substance, fluorolipid, cyclodextrin, fullerene, molecular tong, porphyrin, steroid, photosensitive molecule, fluorescent pigment, sugar, crown ether, dendrimer, polypeptide, metallic fine particle, magnetic fine particle, polymeric fine particle, micro-particle, micelle or reversed micelle containing glycolipid, fluorolipid or protein, etc. As for the substance to be included in the second fluid, there is no particular limitation as long as the substance is capable of being stably existed in the second fluid or between the molecules of emulsifier 14, or on the inner or outer membrane of double emulsion, vesicle or reversed vesicle.

As for the substance to be incorporated into the third fluid, it is possible to employ aromatic or odorous substances, drug, chemicals, dyestuffs, fluorescent agents, redox agents, amino acid, peptide, polypeptide, sugar, protein, nucleic acid, nucleic acid-related substances, metallic fine particle, magnetic fine particle, polymeric fine particle, micro-particle, dendrimer, carbon nanohone, micelle containing oil-soluble drug, reversed micelle containing water pool-soluble drug or protein, cell such as lactic acid bacterium and *E. coli*, liquid crystal, or micelle or reversed micelle containing glycolipid, fluorolipid or protein, etc.

Owing to the interaction with the second fluid, the substances to be added to the third fluid are enabled to exist in the second fluid or between the molecules of emulsifier 14, or adhere onto the inner or outer membrane of double emulsion, vesicle or reversed vesicle. As in the case of the substances to be added to the second fluid, the substances to be added to the third fluid are capable of acting as a modifying medium that can modify the membrane of double emulsion, vesicle or reversed vesicle. On the other hand, the substances to be added to the third fluid may be enclosed in a multiple-phase.

In the manufacturing apparatus 1 shown in FIG. 6, the second fluid 12 containing a different emulsifier 14 and the third fluid 13 containing a different substance will be alternately fed into the channel 3. As a result, various kinds of multiple-phase particles 20 each enclosing a different substance can be manufactured. Furthermore, it is possible, through the employment of the manufacturing apparatus shown in FIG. 6, to manufacture a double emulsion or a vesicle where the inner membrane and the outer membrane are asymmetrical to each other, a double emulsion, a multilamellar vesicle or a vesicle which contain various kinds of bioactive substance, a double emulsion, a multilamellar reversed vesicle or a reversed vesicle where the membrane thereof is modified by protein.

Second Application Example

Figure 7:
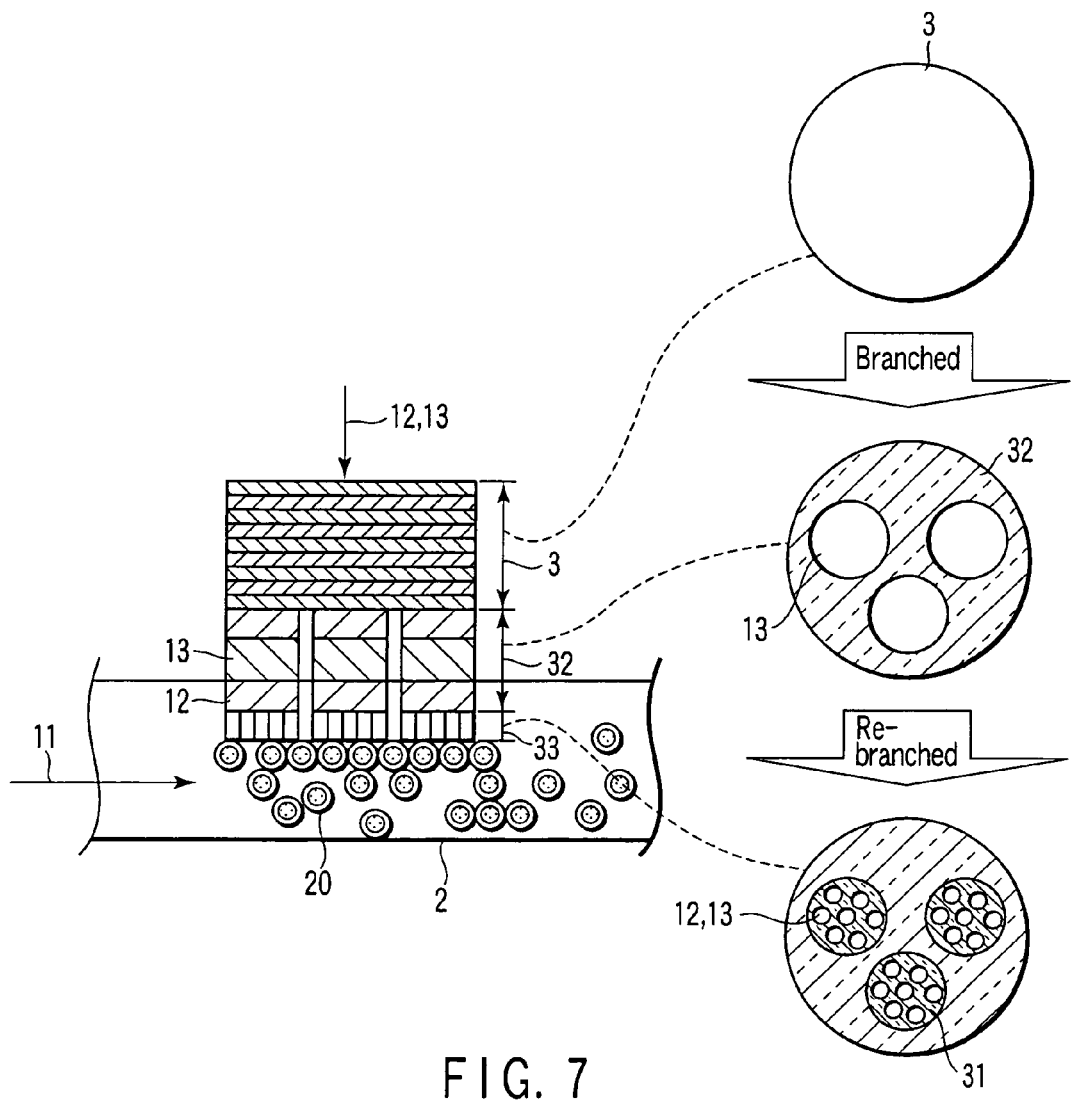
FIG. 7 is a diagram schematically illustrating a main portion of the apparatus for manufacturing a multiple-phase particle according to a second application example of the first embodiment of the present invention.

FIG. 7 shows a schematic view of the main portion of manufacturing apparatus of multiple-phase particle according to the second application example of the first embodiment. Namely, FIG. 7 shows a region in the vicinity of the outlet port 31 of the manufacturing apparatus 1 shown in FIG. 1. As shown in FIG. 7, a first branch channel 32 and a second branch channel 33 are extended from the outlet ports 4A and 5A of the channel 3 to the outlet port 31. The first branch channel 32 is designed to redifferentiate the second fluid 12 containing an emulsifier 14 and the third fluid 13 which are introduced into the channel 3. The second branch channel 33 is designed to further redifferentiate the second fluid 12 and the third fluid 13 that have been redifferentiate at the first branch channel 32.

In FIG. 7, the cross-sectional structures of the channel 3, the first branch channel 32 and the second branch channel 33 as well as the configuration of the outlet port 31 are shown. The third fluid 13 is introduced into the second fluid 12 which has been redifferentiated at the second branch channel 33. As the third fluid 13 is introduced in this manner, the second fluid 12 is pushed into the first fluid 11. As a result, it is possible to form a multiple-phase particle 20 where the third fluid is enclosed in the second fluid.

By using the manufacturing apparatus provided with the channel 3 comprising the first branch channel 32 and the second branch channel 33, a plural kinds of multiple-phase particles 20 corresponding to the ultimate number of the second branch channel 33 can be simultaneously manufactured.

Incidentally, there is no particular limitation with regard to the number of branch channels, so that one or not less than three branch channels can be disposed at the channel 3.

Third Application Example

Figure 8:
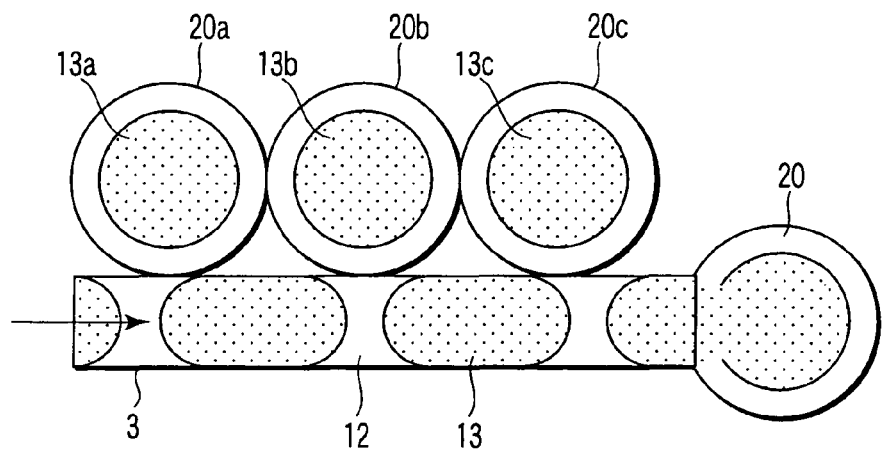
FIG. 8 is a diagram schematically illustrating a main portion of the apparatus for manufacturing a multiple-phase particle according to a third application example of the first embodiment of the present invention.

FIG. 8 shows a schematic view of the main portion of manufacturing apparatus of multiple-phase particle according to the third application example of the first embodiment. In the apparatus shown in FIG. 8, the outer surface of the channel 3 has the same surface characteristics as those of the outlet port 31. Alternatively, the outer surface of the channel 3 has affinity to the multiple-phase particle. By controlling the manufacturing conditions such as the state of the first fluid 11 at the continuous-phase supply portion 2, the multiple-phase particles 20 can be adhered to and arrayed regularly along the outer surface of the channel 3. These multiple-phase particles 20 can be manufactured as a single inner aqueous phase type multiple-phase particle 20A as shown in FIG. 2 or as a multiple inner aqueous phase type multiple-phase particle 20B.

When the sidewall of the continuous-phase-generating portion has the same surface characteristics as those of the channel 3, the multiple-phase particle can be, likewise, regularly arrayed on the sidewall of the continuous-phase-generating portion. The same can be said also in the case where the sidewall of the continuous-phase-generating portion has affinity to the multiple-phase particle.

When the channel 3 is connected with a movable apparatus (for example, an XYZ stage) in the process of manufacturing the multiple-phase particle, the channel 3 can be moved three-dimensionally. Therefore, the multiple-phase particle can be manufactured at a predetermined location.

As explained above, in the method of manufacturing the multiple-phase particles 20 according to the first embodiment of the present invention, it is possible to realize a single stage emulsification method. Thus, it is possible to quickly and automatically manufacture a multiple-phase particle 20 which is minimal in non-uniformity with regard to the particle diameter, film thickness and sealed content, more specifically, a multiple inner aqueous phase type emulsion, a multiple inner oil phase type emulsion, a multiple inner vapor phase type emulsion, a single inner aqueous phase type emulsion, a single inner vapor phase type emulsion, a single inner oil phase type emulsion, vesicle, liposome or reversed vesicle.

Further, according to the manufacturing method of the first embodiment, the multiple-phase particle 20 can be manufactured under moderate conditions. It is also possible to obtain a multiple-phase particle 20 where a bioactive substance of high activity is efficiently sealed therein.

Further, according to the manufacturing method of the first embodiment, it is possible to manufacture the multiple-phase particle 20 where the inner membrane thereof differs from the outer membrane thereof. Additionally, according to the manufacturing method of the first embodiment, it is possible to manufacture the multiple-phase particle 20 which includes different kinds of phases.

In the manufacturing method of the first embodiment, it is possible to manufacture the multiple-phase particle 20 where more than one kind of substance is enclosed therein. According to the manufacturing apparatus 1 of the first embodiment, it is possible to easily execute the aforementioned manufacturing methods.

Next, specific examples according to the first embodiment of the present invention will be explained.

Comparative Example 1

A soft glass capillary (inner diameter=200 µm, outer diameter=300 µm, length=40 mm) which was not surface-treated was prepared. This capillary was then connected with the needle of microsyringe for gas chromatography (10 µL, HAMILTON Co., Ltd., type 84853) by using a Teflon (registered trademark) heat tube, thereby forming a channel 3. Then, a microsyringe was fixed to a repeating dispenser.

Monoolein was employed as an emulsifier 14, and decane was used as a solvent of the monoolein. The second fluid 12 containing the emulsifier 14 was prepared by dissolving the monoolein in decane in the concentration of 5 wt %. As for the third fluid 13, an aqueous solution of water-soluble blue ink was employed. Further, pure water was employed as the first fluid 11.

Then, by suction method, a $W_1/Os/W_2$ emulsion was manufactured. More specifically, a distal end portion (outlet port 31) of the glass capillary connected with the microsyringe was alternately dipped into the second fluid 12 containing the emulsifier 14 and into the third fluid 13, thereby respectively sucking about 35 nL-100 nL of these fluids. Then, a distal end portion (outlet port 31) of the glass capillary was introduced into a tube filled with pure water employed as the first fluid 11, and then, by using a repeating dispenser, the second fluid 12 and the third fluid 13 were alternately pushed out of the microsyringe. By using an optical microscope (Keyence VH-5910), the behavior of formation of a blue-ink-entrapped $W_1/Os/W_2$ emulsion was observed. By using the glass capillary, a solution of monoolein/decane (5 wt %) (Os) lipid employed as the second fluid 12 containing an emulsifier 14 and a solution of blue ink employed as the third fluid 13 were alternately pushed out. As a result, an $Os/W_2$ emulsion was mainly obtained.

Example 1

A polypropylene microtube (inner diameter=200 µm, outer diameter=300 µm) was connected with the needle of microsyringe for gas chromatography (10 µL, HAMILTON Co., Ltd., type 84853), thereby forming a channel 3. In the following description, this channel 3 will be referred to as a microtube.

Then, in the same manner as in the case of Comparative Example 1, the second fluid 12 (Os) containing an emulsifier 14, the third fluid 13 ($W_1$), and the first fluid 11 ($W_2$) were employed to manufacture a single inner aqueous phase type $W_1/Os/W_2$ emulsion entrapping blue ink by the same suction method as described above.

Figure 9A:
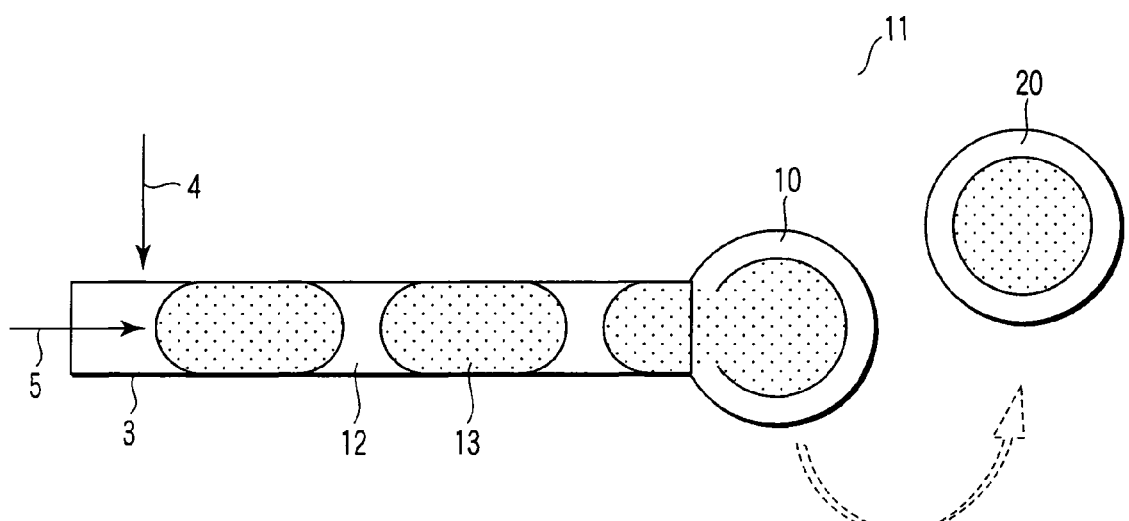
FIG. 9A is a diagram schematically illustrating the method of manufacturing a single inner aqueous phase type $W_1/Os/W_2$ emulsion having ink entrapped therein by using suction method according to Example 1 of the first embodiment of the present invention.
Figure 9B:
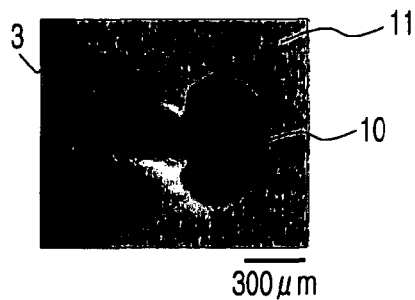
FIG. 9B is a photograph illustrating a state wherein a third fluid 13 is poured into a second fluid 12 in Example 1 of the first embodiment of the present invention.

FIG. 9A shows a schematic diagram illustrating the manufacture of the single inner aqueous phase type $W_1/Os/W_2$ emulsion entrapping ink by suction method according to Example 1. FIG. 9B shows a state where an aqueous solution of blue ink employed as the third fluid 13 was being introduced into the monoolein/decane (5 wt %) (Os) (a lipid solution phase) employed as the second fluid 12 containing an emulsifier 14.

What is appeared white around the microtube (channel 3) illustrates a phenomenon that generated due to the refraction of light by the monoolein/decane (5 wt %) (Os) (a lipid solution phase). As shown in FIG. 9B, the microtube exhibiting hydrophobicity was capable of trapping the second fluid 12 (Os) exhibiting hydrophobicity. Further, the microtube was capable of trapping an intermediate body 10 which was being expanded as the third fluid 13 was being introduced into the intermediate body 10 following the extrusion of the second fluid 12.

As the third fluid 13 was continued to be introduced into this intermediate body 10 and this intermediate body 10 was continued to expand, the intermediate body 10 was grown into a semispherical body and then a microspherical body. When the microspherical body was expanded to a size which was large enough to release, the microspherical body was permitted to leave from the tip (outlet port 31) of tube and enter into the first fluid 11. In this manner, it was confirmed that it was possible to manufacture, as a multiple-phase particle 20, a single inner aqueous phase type $W_1/Os/W_2$ emulsion entrapping ink.

Figure 9C:
FIG. 9C is a photograph showing the multiple-phase particle which was manufactured in Example 1 of the first embodiment of the present invention.

The photograph of the multiple-phase particle 20 manufactured according to Example 1 is shown in FIG. 9C. This multiple-phase particle is a single inner aqueous phase type $W_1/Os/W_2$ emulsion entrapping a water-soluble blue ink at a high concentration. It was observed that when this multiple-phase particle was pierced using a needle, the ink-entrapped emulsion was instantaneously collapsed and at the same time, blue ink was simultaneously released from the ink-entrapped emulsion.

Figure 9D:
FIG. 9D is a photograph showing a state where a blue ink solution is dropped into an aqueous solution.

For the purpose of comparison, the photograph illustrating a state when a solution of blue ink was poured into an aqueous solution is shown in FIG. 9D. As shown in FIG. 9D, since the blue ink was water-soluble, it was difficult for the blue ink to retain a fixed configuration in an aqueous solution. Thus, the blue ink was quickly dispersed in the aqueous solution. In view of these facts, the emulsion enclosing blue ink at a high concentration was apparently a single inner aqueous phase type $W_1/Os/W_2$ emulsion.

Figure 9E:
FIG. 9E is a photograph showing the multiple-phase particle which was manufactured in Example 1 of the first embodiment of the present invention.

On the other hand, when the first fluid 11 is in a state of stationary phase in FIG. 9A, even if a single inner aqueous phase type $W_1/Os/W_2$ emulsion entrapping blue ink at a high concentration is manufactured as a multiple-phase particle 20, it is difficult to enable the multiple-phase particle 20 to separate from the microtube (channel 3). Thus, the multiple-phase particle 20 was moved along the outer sidewall of the microtube. Alternatively, as shown in FIG. 9E, the multiple-phase particle 20 adhered onto the microtube. According to this method, it is possible to array the multiple-phase particle 20 along the microtube.

As described above, according to Example 1, it was possible to manufacture a single inner aqueous phase type $W_1/Os/W_2$ emulsion entrapping blue ink.

Example 2

Figure 10A:
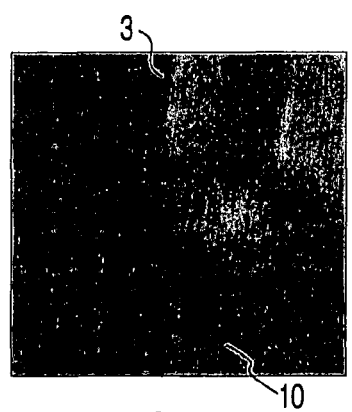
FIGS. 10A and 10B are photographs illustrating the process of manufacturing a single inner aqueous phase type $W_1/Os/W_2$ emulsion having ink entrapped therein by using suction method according to Example 2 of the first embodiment of the present invention.
Figure 10B:
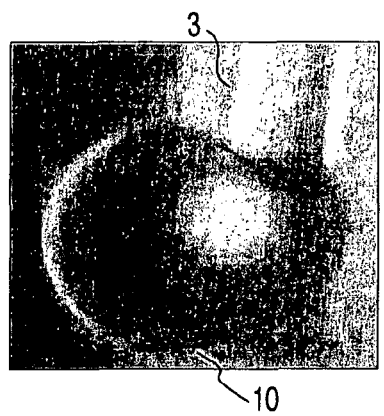

A single inner aqueous phase type $W_1/Os/W_2$ emulsion was manufactured under the same conditions as Example 1 except that a thin blue ink was employed as the third fluid 13. This emulsion contained a thin blue ink and was minimal in scattering of particle diameter. FIGS. 10A and 10B illustrate the process of manufacturing the emulsion. The second fluid 12 containing an emulsifier 14 was introduced into the tube and then the third fluid 13 was introduced into the tube, thereby expanding the second fluid 12 at first into a semispherical body. Then, it was observed that the semispherical body deformed while being gradually shifted laterally. The single inner aqueous phase type $W_1/Os/W_2$ emulsion thus formed is shown in FIG. 10B.

Figure 10C:
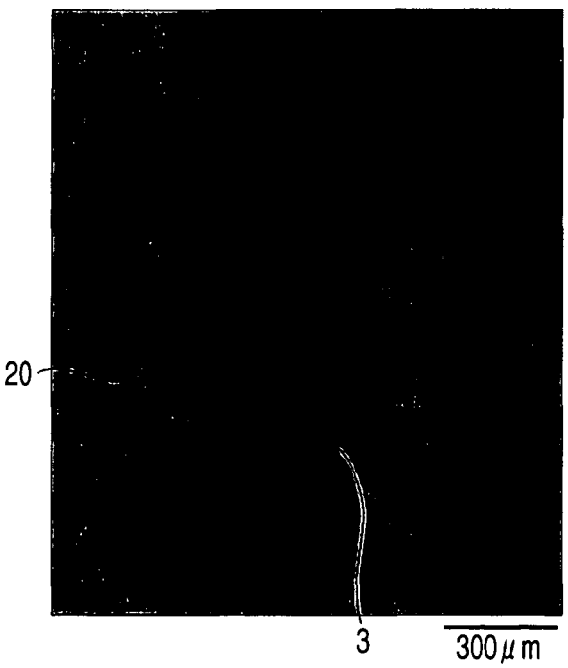
FIG. 10C is a photograph showing the multiple-phase particle which was manufactured in Example 2 of the first embodiment of the present invention.
Figure 11A:
FIGS. 11A to 11D are photographs illustrating the process of manufacturing a single inner vapor phase type $V/Os/W_2$ emulsion according to Example 3 of the first embodiment of the present invention.
Figure 11B:
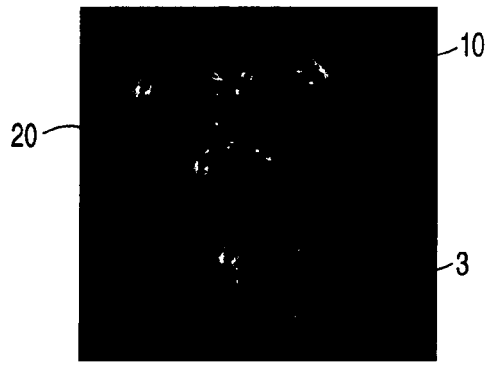
Figure 11C:
Figure 11D:
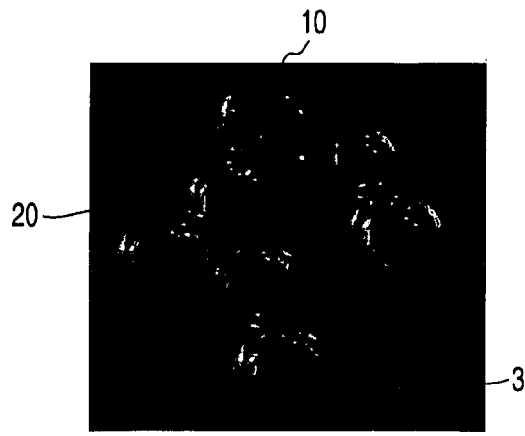

Further, when the first fluid 11 was in a state of stationary phase, it was possible to enable the single inner aqueous phase type $W_1/Os/W_2$ emulsion of the similar configuration to array along the microtube (channel 3) as shown in FIG. 10C.

Example 3

A single inner vapor phase type $V/Os/W_2$ emulsion was manufactured under the same conditions as Example 1 except that air was employed as the third fluid 13. FIGS. 11A to 11D illustrate the process of successively manufacturing the single inner vapor phase type $V/Os/W_2$ emulsion, i.e., one, four, six and seven pieces thereof, respectively.

Example 4

An emulsion was manufactured under the same conditions as Example 1 except that the second fluid 12 containing an emulsifier 14 was formulated such that sorbitan monooleate was employed as the emulsifier 14, n-hexadecane was used as a solvent of the sorbitan monooleate. The second fluid 12 containing the emulsifier 14 was prepared by dissolving the sorbitan monooleate in n-hexadecane in the concentration of 0.088 M or 0.1.

Figure 12A:
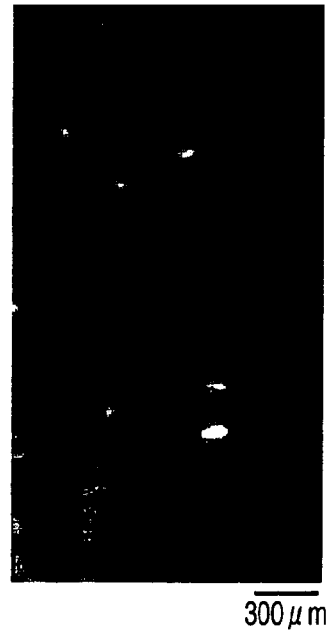
FIGS. 12A and 12B are photographs illustrating the process of manufacturing a single inner aqueous phase type $W_1/Os/W_2$ emulsion according to Example 4 of the first embodiment of the present invention.
Figure 12B:
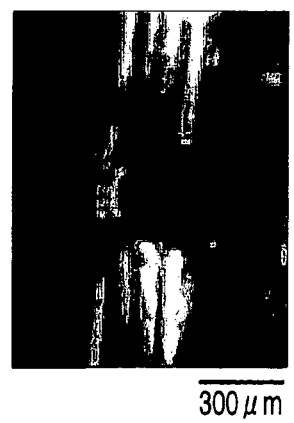

FIGS. 12A and 12B illustrate a single inner aqueous phase type $W_1/Os/W_2$ emulsion entrapping blue ink where the concentration of the emulsifier 14 in the solution was set to 0.088 M. In this case, the single inner aqueous phase type $W_1/Os/W_2$ emulsion was left free and permitted to adhere onto the outer sidewall of microtube (channel 3).

Figure 13A:
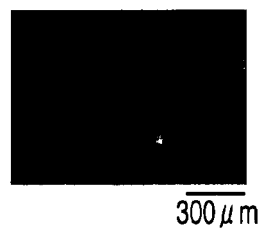
FIGS. 13A to 13C are photographs illustrating the process of manufacturing a single inner aqueous phase type $W_1/Os/W_2$ emulsion according to Example 4 of the first embodiment of the present invention.

FIG. 13A shows a process of introducing blue ink into the second fluid 12 containing the emulsifier 14 (0.1 M). The single inner aqueous phase type $W_1/Os/W_2$ emulsion entrapping blue ink can be manufactured by introducing blue ink employed as the third fluid 13 into the second fluid 12 as in the case where monoolein was employed as the emulsifier 14.

Figure 13B:
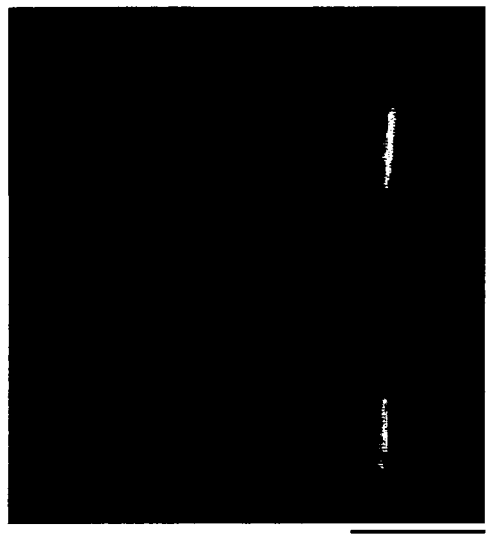
Figure 13C:
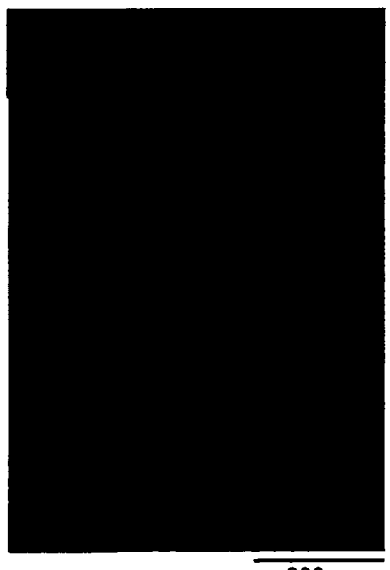

FIGS. 13B and 13C illustrate a state where the single inner aqueous phase type $W_1/Os/W_2$ emulsion entrapping blue ink was adhered onto the outer sidewall of microtube and a state where blue ink was released after the collapse of the emulsion. Concurrent with the instantaneous collapsing of the emulsion enclosing blue ink, the blue ink was permitted to release. Accordingly, the emulsion manufactured under the manufacturing conditions of this example was apparently a single inner aqueous phase type emulsion.

Comparative Example 2

Figure 14A:
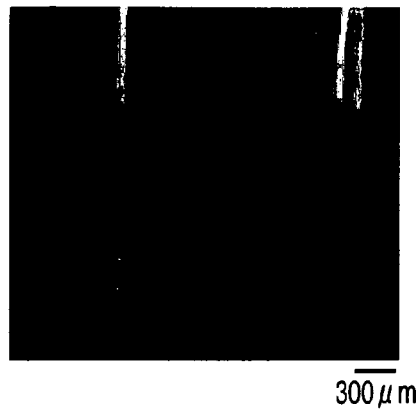
FIGS. 14A and 14B are photographs illustrating Comparative Example 2 of the first embodiment of the present invention.
Figure 14B:
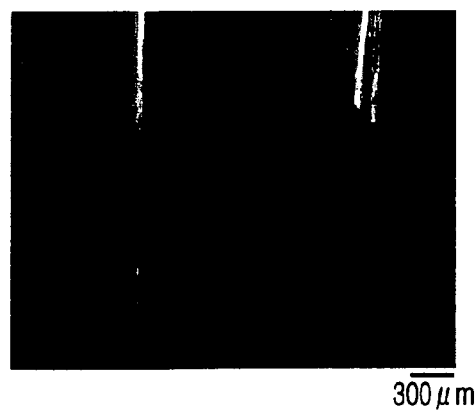

An emulsion was manufactured under the same conditions as Example 4 except that the volume of aqueous solution of blue ink employed as the third fluid 3 was increased to about ten times as large as that of Example 4. It was possible, as shown in FIGS. 14A and 14B, to manufacture a multiple inner aqueous phase type emulsion. However, it was difficult to minimize the scattering in size of inner aqueous phase.

Example 5

A single inner aqueous phase type emulsion was manufactured under the same conditions as Example 4 except that the manufacturing velocity (extrusion velocity) was altered. According to the principle shown in FIG. 2, a single inner aqueous phase type emulsion was manufactured. As a result, it was possible to obtain a multiple inner aqueous phase type emulsion (20B) where the inner aqueous phase was minimal in scattering of particle diameter as shown in FIG. 15. In this example, the first fluid 11 was formed of a stationary system and the outer sidewall of the microtube was hydrophobic. Therefore, the multiple inner aqueous phase type emulsion thus manufactured was retained at the distal end of the microtube.

Example 6

An emulsion was manufactured under the same conditions as Example 4 except that the inner diameter and outer diameter of microtube were altered (inner diameter=100 μm, outer diameter=150 μm) and that the quantity of the second fluid 12 containing an emulsifier 14 as well as the quantity of the third fluid 13 (an aqueous solution of blue ink) were altered.

The single inner aqueous phase type emulsion enclosing an aqueous solution of blue ink thus obtained is shown in FIG. 16A. FIGS. 16B and 16C illustrate a multiple inner aqueous phase type emulsion where the inner aqueous phase was minimal in scattering of particle diameter. The single inner aqueous phase type emulsion manufactured in Example 6 was smaller in particle diameter as compared with that of emulsion manufactured in Example 4. Further, the particle diameter of the inner aqueous phase of multiple inner aqueous phase type emulsion manufactured in Example 6 was smaller in particle diameter as compared with that of emulsion manufactured in Example 5. It was possible, through the control of the inner diameter of microtube and the quantity of the second fluid 12 as well as the quantity of the third fluid 13, to control not only the particle diameter of the multiple-phase particle but also the particle diameter of the inner aqueous phase thereof.

Example 7

An emulsion was manufactured under the same conditions as Example 4 except that air and an aqueous solution of thin blue ink were employed as the third fluid 13 and 0.1 M NaCl solution was employed as the first fluid 11. Further, an emulsion was manufactured under the same conditions as Example 4 except that air and an aqueous solution of thin blue ink were respectively employed as the third fluid 13 and that these third fluid 13 were alternately introduced into the microtube with the second fluid 12 being interposed therebetween.

FIGS. 17A and 17B illustrate a single inner aqueous phase type emulsion entrapping blue ink and adhered to the microtube, and a single inner vapor phase type emulsion, respectively.

FIG. 17C illustrates an emulsion where air and a thin blue ink were introduced respectively as a segment of the third fluid 13 into the microtube. As shown in FIG. 17C, it was possible to manufacture an emulsion where an inner vapor phase and an inner aqueous phase were coexisted.

Example 8

An emulsion was manufactured under the same conditions as Example 4 except that a microtube whose distal end portion (the outlet port 31 of channel 3) was cut out at an angle of 20 degrees was employed as the microtube, that a solution containing a high concentration of blue ink and air were employed as the third fluid 13, and that 0.1 M NaCl was employed as the first fluid 11.

FIGS. 18A and 18B illustrate a single inner aqueous phase type emulsion entrapping blue ink, and a single inner vapor phase type emulsion, respectively.

Second Embodiment

In the manufacturing apparatus 1 for a multiple-phase particle 20 according to the first embodiment, the construction of the channel 3 can be modified. The second embodiment of the present invention illustrates this modification. In the explanation of this embodiment, the constituent elements which function in the same manner as those employed in the aforementioned first embodiment will be referred to by the same reference numerals, thereby omitting the duplication of explanation thereof.

In this second embodiment of the present invention, there are explained a method as well as an apparatus for manufacturing multiple-phase particles 20 of various states such as a single inner aqueous phase type W/O/W emulsion, a multiple inner aqueous phase type W/O/W emulsion, vesicle, a single inner oil phase type O/W/O emulsion, a multiple inner oil phase type O/W/O emulsion, reversed vesicle, a single inner vapor phase type V/O/W emulsion, a multiple inner vapor phase type emulsion, etc.

Figure 19A:
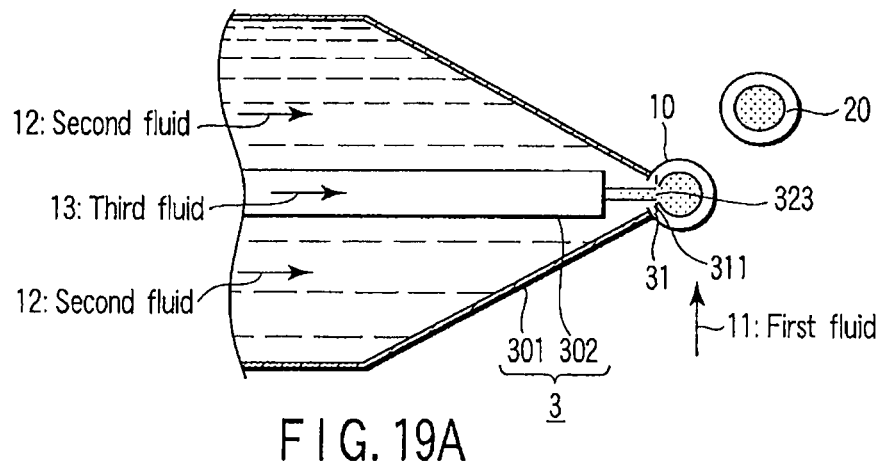
FIGS. 19A and 19B are enlarged views of the channel installed in the apparatus for manufacturing a multiple-phase particle according to the second embodiment of the present invention.

The manufacturing apparatus 1 for a multiple-phase particle 20 according to the second embodiment is fundamentally the same in construction as the manufacturing apparatus 1 for a multiple-phase particle 20 according to the first embodiment. As shown in FIG. 19A, the construction of the channel 3 differs from that of the FIG. 3. The channel 3 is formed of a dual passage structure consisting of an outer circumferential passage (outer passage) 301, and an inner circular passage (inner passage) 302 disposed inside the outer circumferential passage 301. The outer circumferential passage (outer passage) 301 guides the second fluid 12 containing an emulsifier 14 from the inlet port 4A of the channel 3 to the outlet port 31. On the other hand, the inner circular passage (inner passage) 302 guides the third fluid 13 from the inlet port 5A of the channel 3 to the outlet port 31.

The outlet port 31 is an outlet port of entire channel 3. At the circumferential portion of the outlet port 31, the outlet port 311 of the outer circumferential passage (outer passage) 301 is disposed for discharging the second fluid 12. At the central portion of the outlet port 31, the outlet port 312 of the inner circular passage 302 is disposed for discharging the third fluid 13.

Figure 19B:
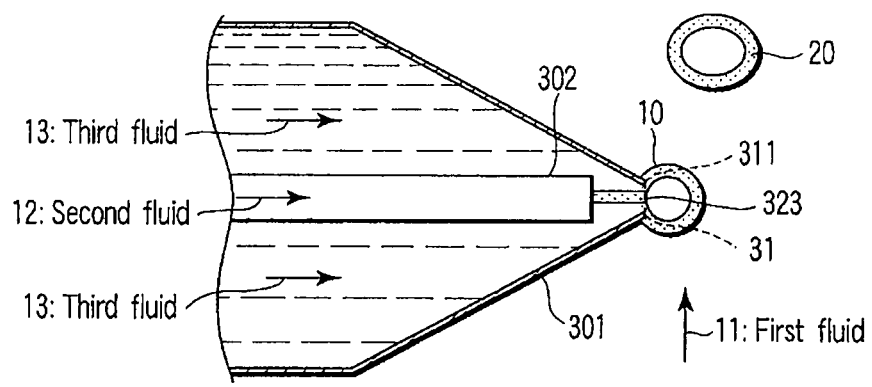

As shown in FIG. 19B, the channel 3 is formed of a dual passage structure consisting of an outer circumferential passage (outer passage) 301, and an inner circular passage (inner passage) 302. The outer circumferential passage (outer passage) 301 guides the third fluid 13 from the inlet port 5A of the channel 3 to the outlet port 31. On the other hand, the inner circular passage (inner passage) 302 guides the second fluid 12 containing an emulsifier 14 from the inlet port 4A to the outlet port 31.

The outlet port 31 is an outlet port of entire channel 3. At the circumferential portion of the outlet port 31, the outlet port 311 of the outer circumferential passage 301 is disposed for discharging the third fluid 13. At the central portion of the outlet port 31, the outlet port 312 of the inner circular passage 302 is disposed for discharging the second fluid 12.

In the manufacturing apparatus 1 (channel 3) shown in FIG. 19A, the second fluid 12 containing an emulsifier 14 is fed from the second fluid supply portion 4 shown in FIG. 3 to the outer circumferential passage (outer passage) 301 of the channel 3, and the third fluid 13 is fed from the third fluid supply portion 5 to the inner circular passage 302. At the outlet port 31 of the channel 3, the third fluid 13 from the outlet port 312 of the inner circular passage 302 and the second fluid 12 from the outlet port 311 of the outer circumferential passage 301 are alternately discharged at constant intervals. At the outlet port 31, the second fluid 12 is pushed into the first fluid 11 while introducing the third fluid 13 into the second fluid 12. In this way, an intermediate body 10 of the multiple-phase particle 20 can be formed.

Further, from this intermediate body 10, a multiple-phase particle 20 where the third fluid 13 is entrapped in the second fluid 12 can be formed. By alternately extruding the second fluid 12 and the third fluid 13 at fixed intervals from the outlet port 31 into the first fluid 11, it is possible to obtain a multiple-phase particle 20 which is minimal in non-uniformity with regard to the particle diameter, film thickness and sealed content.

Further, in the manufacturing apparatus 1 (channel 3) shown in FIG. 19B, the second fluid 12 containing an emulsifier 14 is fed from the second fluid supply portion 4 shown in FIG. 3 to the inner circular passage 302 of the channel 3, and the third fluid 13 is fed from the third fluid supply portion 5 to the outer circumferential passage 301. At the outlet port 31 of the channel 3, the second fluid 12 from the outlet port 312 of the inner circular passage 302 and the third fluid 13 from the outlet port 311 of the outer circumferential passage 301 are alternately discharged at constant intervals. As a result, at the outlet port 31, the third fluid 13 is introduced into the second fluid 12. At the same time, the second fluid 12 is pushed into the first fluid 11.

In this way, an intermediate body 10 of the multiple-phase particle 20 can be formed. Further, from this intermediate body 10, a multiple-phase particle 20 where the third fluid 13 is entrapped in the second fluid 12 can be formed. By alternately extruding the second fluid 12 containing an emulsifier 14 and the third fluid 13 at fixed intervals from the outlet port 31 into the first fluid 11, it is possible to obtain a multiple-phase particle 20 which is minimal in non-uniformity with regard to the particle diameter, film thickness and sealed content.

According to the same principle as that explained with reference to FIG. 8 of the aforementioned first embodiment, even in the channel 3 according to the second embodiment, the multiple-phase particle 20 can be adhered unidirectionally on the outer surface of the outer circumferential passage 301. In this case, the wettability of the outer surface of the outer circumferential passage 301 and the manufacturing conditions such as flowing rate of the first fluid 11 should be suitably controlled. Further, the multiple-phase particle 20 may be arrayed at random.

As already explained with reference to the first embodiment, the multiple-phase particle 20 thus formed can be ultimately formed into a single inner aqueous phase type multiple-phase particle 20A or into a multiple-phase type multiple-phase particle 20B.

Incidentally, the wettability, in particular, of the outer surface of the outer circumferential passage 301 can be determined relative to the emulsifier 14 to be included in the second fluid 12. Further, the wettability can be determined by suitably selecting the material for the outer circumferential passage 301 (channel 3) or by the roughening work of the surface of the outer circumferential passage 301.

First Application Example

Figure 19C:
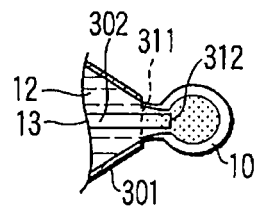
FIGS. 19C to 19E are enlarged views each schematically illustrating a first application example of the channel in the apparatus for manufacturing a multiple-phase particle according to the second embodiment of the present invention.
Figure 19D:
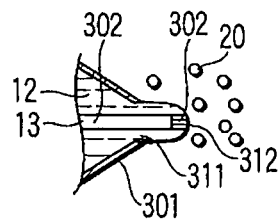
Figure 19E:
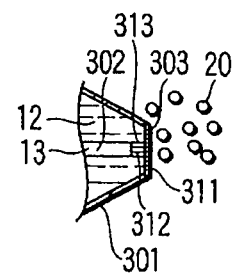

Application examples of the structure of the outlet port 31 of channel 3 are shown in FIGS. 19C to 19E. The channel 3 shown in FIG. 19C is constructed such that the outlet port 312 of the inner circular passage 302 is protruded toward the first fluid 11 more than the outlet port 311 of the outer circumferential passage (outer passage) 301.

The channel 3 shown in FIG. 19D is constructed such that the outlet port 312 of the inner circular passage 302 shown in FIG. 19C is provided with a branch passage 313 shown in FIG. 7 and that the outlet port 312 is formed into a tandem structure in external appearance.

The channel 3 shown in FIG. 19E is constructed such that the location of the outlet port 312 of the inner circular passage 302 is made the same as that of the outlet port 311 of the outer circumferential passage 301 and it is provided with a branch passage 313 shown in FIG. 19D. The outlet port 311 of the outer circumferential passage 301 is equipped with a nanoporous filter 303. When the outer circumferential passage 301 is made of a material such as aluminum, titanium, silicon, etc., the nanoporous filter can be easily manufactured in the vicinity of the outlet port 311 by using electrochemical etching (ECE) technique, i.e. anodic oxidation or etching technique for instance. It is possible, through the control of etching conditions of ECE, to manufacture a nanoporous filter having a pore size ranging from 5 nm to 500 nm.

Second Application Example

Application examples of the structure of the outlet port 31 of channel 3 are shown in FIGS. 20A to 20F according to the fist application example shown in FIG. 19A. The configuration of the outlet port 31 is fundamentally constructed such that the outlet port 312 of the inner circular passage 302 is disposed at a central portion of the outlet port 31 of channel 3. At the peripheral portion of the outlet port 31, the outlet port 311 of the outer circumferential passage 301 is disposed so as to surround the outlet port 312 of the inner circular passage 302. The channel 3 is required to be constructed such that the second fluid 12 can be efficiently fed to the outlet port 311 of the outer circumferential passage 301 for feeding the second fluid 12 containing an emulsifier 14. And the third fluid 13 can be efficiently fed to the outlet port 312 of the inner circular passage 302 for feeding the third fluid 13. There is no particular limitation with regard to the configuration of outlet port 31 of channel 3.

The channel 3 shown in FIG. 20A is constructed such that it comprises an annular outlet port 312 of the inner circular passage 302 and an annular outlet port 311 of the outer circumferential passage 301 which is disposed concentric with the outlet port 312. In any of FIGS. 20A to 20F, the outlet port 312 of the inner circular passage 302 is manufactured using a hydrophilic material. On the other hand, the outlet port 311 of the outer circumferential passage 301 is manufactured using a hydrophobic material in any of FIGS. 20A to 20F, thereby enabling the second fluid 12 containing an emulsifier 14 to be discharged therefrom. The second fluid 12 further spreads out to form a film that adheres onto the outlet port 31.

The channel 3 shown in FIG. 20B is constructed such that it comprises three annular outlet ports 312 of three inner circular passages 302 and an annular outlet port 311 of the outer circumferential passage 301 which is disposed to surround all of these outlet ports 312.

The channel 3 shown in FIG. 20C is constructed such that it comprises seven annular outlet ports 312 of seven inner circular passages 302 and an annular outlet port 311 of the outer circumferential passage 301 which is disposed to surround all of these outlet ports 312.

The channel 3 shown in FIG. 20D is constructed such that it comprises a plurality of annular outlet ports 312 disposed in a single inner circular passage 302 and an annular outlet port 311 of the outer circumferential passage 301 which is disposed to surround all of these outlet ports 312.

The channel 3 shown in FIG. 20E is constructed such that it comprises a trianglar outlet port 312 of the inner circular passage 302 and an annular outlet port 311 of the outer circumferential passage 301 which is disposed to surround all of these outlet ports 312.

The channel 3 shown in FIG. 20F is constructed such that it comprises an annular outlet port 312 of the inner circular passage 302 and a rectangular outlet port 311 of the outer circumferential passage 301 which is disposed to surround the outlet port 312.

Each of the inlet ports of the inner circular passages 302 shown in FIGS. 20B to 20D may be constructed separately from each other. Alternatively, these inlet ports may be formed integral with each other. When these inlet ports are individually constructed, different kinds of multiple-phase particles 20 of inner vapor phase type, liquid phase type and oil phase type double emulsions can be manufactured.

Incidentally, as for the first fluid 11, the emulsifier 14, the second fluid 12 and the third fluid 13, the same kinds of substances as described with reference to the aforementioned first embodiment can be used. These fluids including the first fluid 11 can be optionally combined with each other depending on the kind of multiple-phase particle 20 desired to obtain.

Third Application Example

Figure 21A:
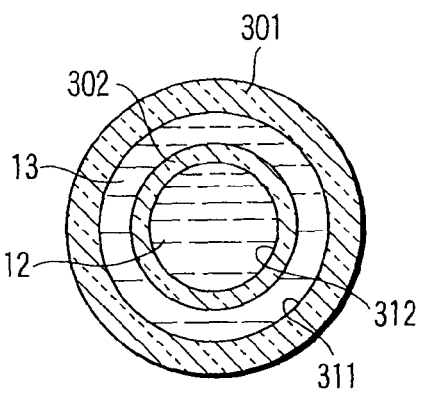
FIGS. 21A to 21D are diagrams each illustrating the configuration of the outlet port of the channel according to the third application example of the second embodiment of the present invention.

Application examples of the structure of the outlet port 31 of channel 3 are shown in FIGS. 21A to 21D according to the fist application example shown in FIG. 19B. The channel 3 shown in FIG. 21A is constructed is constructed in the same manner with respect to the configuration as that the outlet port 31 of channel 3 shown in FIG. 20A except that the outlet port 312 of the inner circular passage 302 and the outlet port 311 of the outer circumferential passage 301 are both made of hydrophobic materials. The inner circular passage 302 shown in FIGS. 21A to 21D is designed such that the second fluid 12 containing an emulsifier 14 is fed thereto.

Figure 21B:
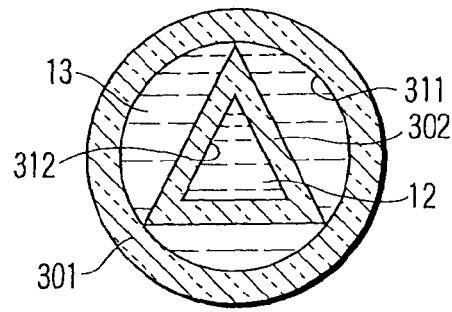

The channel 3 shown in FIG. 21B is constructed in the same manner with respect to the configuration as that the outlet port 31 of channel 3 shown in FIG. 20E except that the outlet port 312 of the inner circular passage 302 and the outlet port 311 of the outer circumferential passage 301 are both made of hydrophobic materials.

Figure 21C:
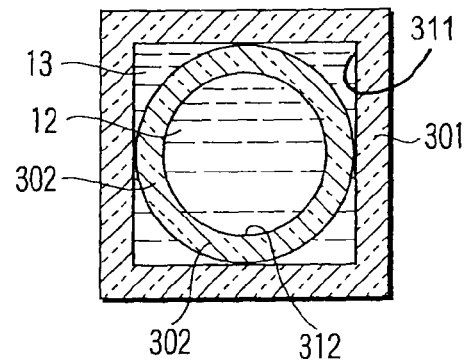

The channel 3 shown in FIG. 21C is constructed in the same manner with respect to the configuration as that the outlet port 31 of channel 3 shown in FIG. 20F except that the outlet port 312 of the inner circular passage 302 and the outlet port 311 of the outer circumferential passage 301 are both made of hydrophobic materials.

Figure 21D:
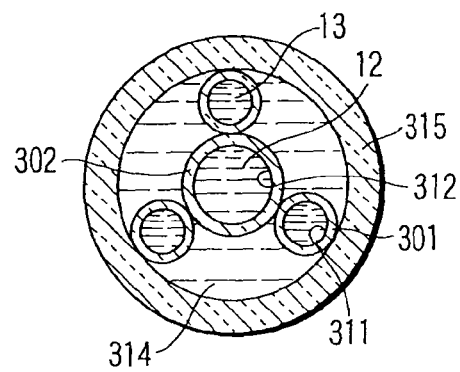

The channel 3 shown in FIG. 21D is constructed such that the outlet port 31 of channel 3 is constructed opposite to the configuration of the outlet port 31 of channel 3 shown in FIG. 20D. Namely, a single annular outlet port 312 of the inner circular passage 302 is surrounded by three annular outlet ports 311 of the outer circumferential passage 301. At least the outer surface of a region of the outer circumferential passage 301 where the outlet ports 311 are located is made hydrophobic and the outer surface of other portions of the outer circumferential passage 315 is made hydrophilic. The outer surface of other portion 314, which is surrounding the inner circular passage 302 and the outer circumferential passage 301, is made hydrophobic. The outlet port 312 of the inner circular passage 302 is formed of a hydrophobic material.

Fourth Application Example

In the channel 3 having a dual passage structure according to the aforementioned second and third application examples of the second embodiment, the surface characteristics of the inner circular passage 302 and the outer circumferential passage 301 may be suitably combined with the features of the first fluid 11, the second fluid 12 and the third fluid 13, thereby making it possible to manufacture various kinds of multiple-phase particle 20.

Figure 22A:
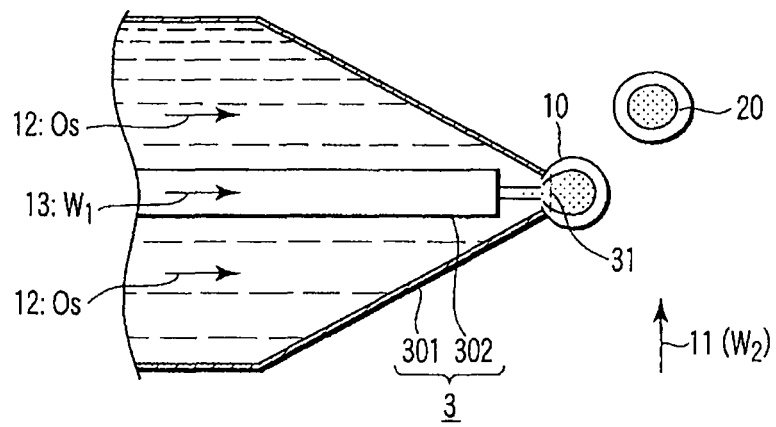
FIGS. 22A and 22B are enlarged views of the channel according to the fourth application example of the second embodiment of the present invention.

As shown in FIG. 22A, it is possible to employ a channel 3 provided with a hydrophobic outer circumferential passage 301. Alternatively, it is also possible to employ a channel 3 where the outer wall of the inner circular passage 302 and the outlet port 312, or the inner wall of the outer circumferential passage 301 and the outlet port 311 are partially lipophilized. In the employment of this channel 3, gas (V) or a hydrophilic liquid ($W_1$) is fed as the third fluid 13 to the inner circular passage 302 and a lipophilic second fluid 12 (Os) containing at least one emulsifier 14 is fed to the outer circumferential passage 301. Then, the second fluid 12 and the third fluid 13 are alternately introduced from the outlet port 31 into a hydrophilic first fluid ($W_2$) at predetermined intervals.

As a result, it is possible to manufacture a multiple-phase particle 20 of a single inner vapor phase type V/Os/$W_2$ emulsion, a multiple inner vapor phase type V/Os/$W_2$ emulsion, a single inner aqueous phase type $W_1$/Os/$W_2$ emulsion, a multiple inner aqueous phase type $W_1$/Os/$W_2$ emulsion, and vesicle.

Figure 22B:
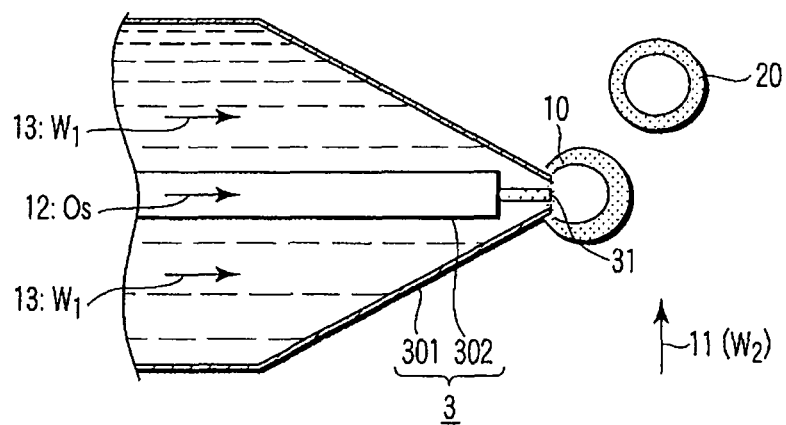

Further, as shown in FIG. 22B, it is possible to employ a channel 3 provided with a hydrophobic inner circular passage 302. Alternatively, it is also possible to employ a channel 3 where the outer wall of the inner circular passage 302 and the outlet port 312, and the inner wall of the outer circumferential passage 301 and the outlet port 311 are partially lipophilized. In the employment of this channel 3, gas (V) or a hydrophilic liquid ($W_1$) is fed as the third fluid 13 to the outer circumferential passage 301 and a lipophilic second fluid 12 (Os) containing at least one emulsifier 14 is fed to the inner circular passage 302.

Then, the second fluid 12 and the third fluid 13 are alternately introduced from the outlet port 31 into a hydrophilic first fluid ($W_2$) at predetermined intervals. As a result, it is possible, through a single-step emulsification method, to manufacture a multiple-phase particle 20 of a single inner vapor phase type V/Os/$W_2$ emulsion, a multiple inner vapor phase type V/Os/$W_2$ emulsion, a single inner aqueous phase type $W_1$/Os/$W_2$ emulsion, a multiple inner aqueous phase type $W_1$/Os/$W_2$ emulsion, and vesicle, wherein the third fluid is entrapped in the second fluid.

Figure 23A:
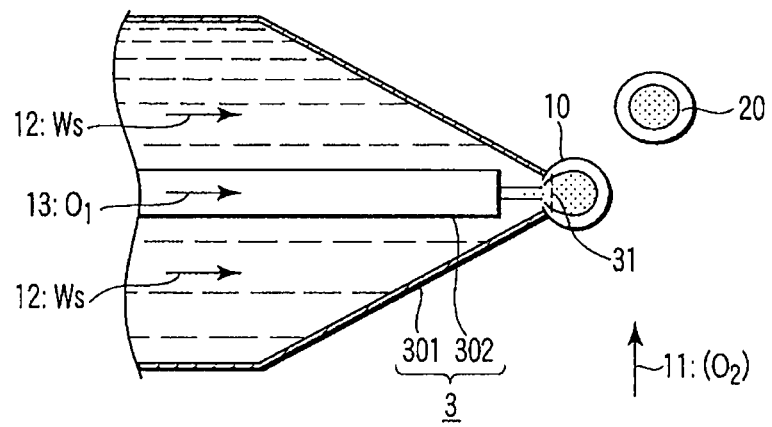
FIGS. 23A and 23B are enlarged views of other channels according to the fourth application example.

As shown in FIG. 23A, it is possible to employ a channel 3 provided with a hydrophilic outer circumferential passage 301. Alternatively, it is also possible to employ a channel 3 where the outer wall of the inner circular passage 302 and the outlet port 312, and the inner wall of the outer circumferential passage 301 and the outlet port 311 are partially hydrophilized. In the employment of this channel 3, gas (V) or a lipophilic liquid ($O_1$) is fed as the third fluid 13 to the inner circular passage 302 and a hydrophilic second fluid 12 (Ws) containing at least one emulsifier 14 is fed to the outer circumferential passage 301.

Then, the second fluid 12 and the third fluid 13 are alternately introduced from the outlet port 31 into a lipophilic first fluid ($O_2$) at predetermined intervals. As a result, it is possible to manufacture, by a single-step emulsification method, a multiple-phase particle 20 of a single inner vapor phase type V/Ws/$O_2$ emulsion, a multiple inner vapor phase type V/Ws/$O_2$ emulsion, a single inner oil phase type $O_1$/Ws/$O_2$ emulsion, a multiple inner oil phase type $O_1$/Ws/$O_2$ emulsion, and reversed vesicle.

Figure 23B:
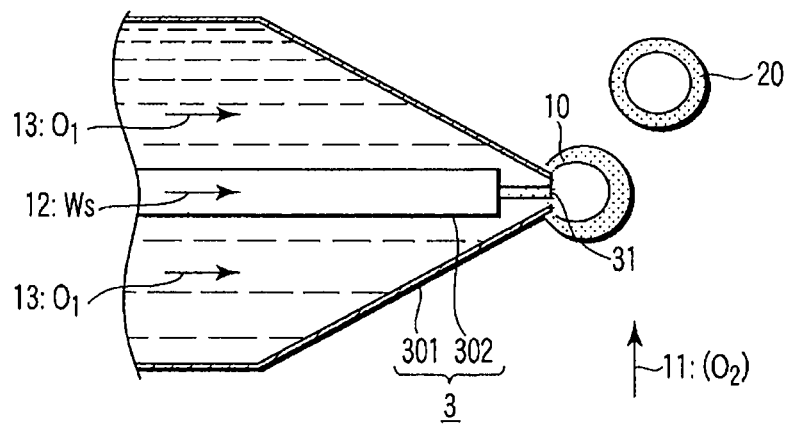

As shown in FIG. 23B, it is possible to employ a channel 3 provided with a hydrophilic inner circular passage 302. Alternatively, it is also possible to employ a channel 3 where the inner wall of the inner circular passage 302 and the outlet port 312, and the inner wall of the outer circumferential passage 301 and the outlet port 311 are partially hydrophilized. In the employment of this channel 3, gas (V) or a lipophilic liquid ($O_1$) is fed as the third fluid 13 to the outer circumferential passage 301 and a hydrophilic second fluid 12 (Ws) containing at least one emulsifier 14 is fed to the inner circular passage 302.

Then, the second fluid 12 and the third fluid 13 are alternately introduced from the outlet port 31 into a lipophilic first fluid ($O_2$) at predetermined intervals. As a result, it is possible to manufacture, by a single-step emulsification method, a multiple-phase particle 20 of a single inner vapor phase type V/Ws/$O_2$ emulsion, a multiple inner vapor phase type V/Ws/$O_2$ emulsion, a single inner oil phase type $O_1$/Ws/$O_2$ emulsion, a multiple inner oil phase type $O_1$/Ws/$O_2$ emulsion, and reversed vesicle.

In the method of manufacturing the multiple-phase particles 20 according to the second embodiment of the present invention, it is possible to realize a single stage emulsification method. Thus, it is possible to automatically manufacture a multiple-phase particle 20 which is minimal in non-uniformity with regard to the particle diameter, film thickness and sealed content, more specifically, a single inner aqueous phase type emulsion, a single inner oil phase type emulsion, a single inner vapor phase type emulsion, vesicle, liposome, reversed vesicle, a multiple inner aqueous phase type emulsion, a multiple inner oil phase type emulsion, a multiple inner vapor phase type emulsion.

Further, according to the manufacturing method of the second embodiment, the multiple-phase particle 20 can be manufactured under moderate conditions. It is also possible to obtain a multiple-phase particle 20 where a bioactive substance of high activity is efficiently sealed therein.

Further, according to the manufacturing method of the second embodiment, it is possible to manufacture the multiple-phase particle 20 where the inner membrane thereof differs from the outer membrane thereof.

Additionally, according to the manufacturing apparatus 1 of the second embodiment, it is possible to easily execute the aforementioned manufacturing methods.

Next, specific examples according to the second embodiment of the present invention will be explained.

Example 1

By using the same structure as that of channel 3 shown in FIG. 22A, a blue ink-enclosed $W_1$/Os/$W_2$ emulsion. More specifically, a stainless steel pipe (inner diameter=130 μm, outer diameter=470 μm) which was cut out at an angle of 20 degrees was used as the inner circular passage 302. As for the outer circumferential passage 301, a polypropylene microtube was employed. Thus, a channel 3 of dual passage structure comprising these inner circular passage 302 and outer circumferential passage 301 was employed.

Sorbitan monooleate was employed as the emulsifier 14, and n-hexadecane was used as a solvent of the Sorbitan monooleate. The second fluid 12 containing the emulsifier 14 was prepared by dissolving the Sorbitan monooleate in n-hexadecane in the concentration of 0.1 M. As for the third fluid 13, an aqueous solution of water-soluble blue ink of low concentration was employed. Further, pure water was employed as the first fluid (continuous-phase) 11.

A Teflon (registered trademark) heat tube was connected with the needle of microsyringe for gas chromatography (10 μL, HAMILTON Co., Ltd., type 84853). Then, a microsyringe was fixed to a repeating dispenser. Further, the outer circumferential passage 301 was also connected with the needle of microsyringe for gas chromatography (10 μL, HAMILTON Co., Ltd., type 84853).

Figure 24A:
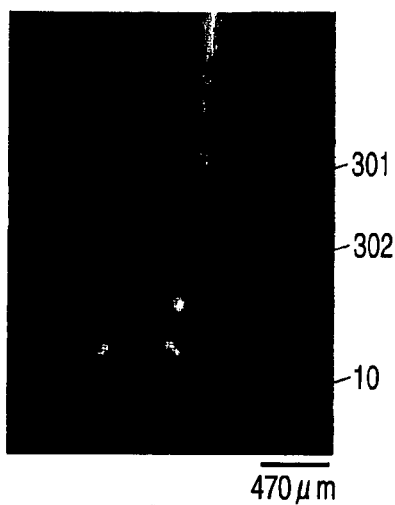
FIGS. 24A to 24C are photographs for illustrating Example 1 of the second embodiment of the present invention.
Figure 24B:
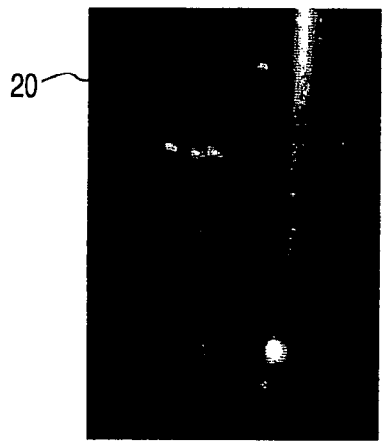

In the manufacture of the blue ink-enclosed $W_1$/Os/$W_2$ emulsion, the second fluid 12 containing the emulsifier 14 was at first pushed out of the outer circumferential passage 301 to enable this solution to adhere onto the inlet port 311. Then, an aqueous solution of blue ink of low concentration employed as the third fluid 13 was pushed out of the inner circular passage 302, thereby introducing the third fluid 13 into the second fluid 12. As the third fluid 13 was continued to introduce into the second fluid 12, the second fluid 12 was enabled to act as a boundary film between the third fluid 13 and the first fluid 11, thereby forming an intermediate body 10 as shown in FIG. 24A. When the third fluid 13 was further continuously introduced into the second fluid 12, the intermediate body 10 was expanded to form a micro-spherical body. When this micro-spherical body was further expanded large enough to reach the releasing stage, the micro-spherical body was separated from the outlet port 31. As a result, as shown in FIG. 24B, the micro-spherical body adhered onto the outer surface of the outer circumferential passage 301, thereby forming a thin blue ink-enclosed $W_1$/Os/$W_2$ emulsion.

Figure 24C:
Figure 26:
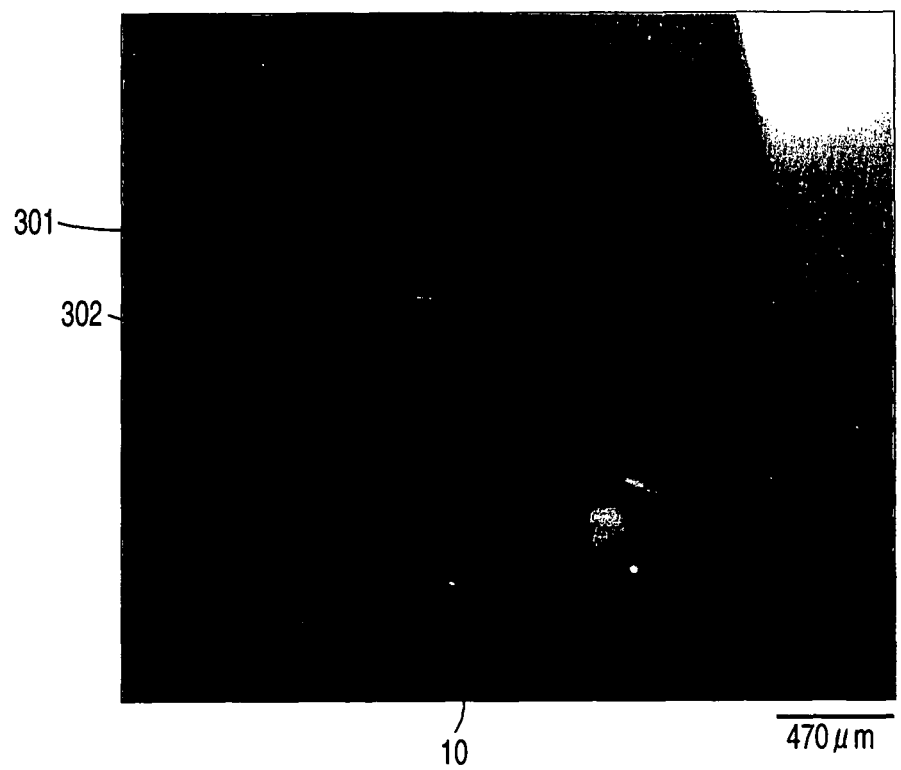
FIG. 26 is a photograph for illustrating Example 3 of the second embodiment of the present invention.

For the purpose of comparison, a thin blue ink employed as the third fluid 13 was continuously discharged from the inner circular passage 302 without continuously supplementing the second fluid 12 to the vicinity of the outlet port 311 from the outer circumferential passage 301. In this case, it was difficult to observe the formion of blue ink-enclosed emulsion, and instead, the outflow of blue ink was observed as shown in FIGS. 24B and 24C.

Example 2

Figure 25A:
FIGS. 25A and 25B are photographs for illustrating Example 2 of the second embodiment of the present invention.
Figure 25B:
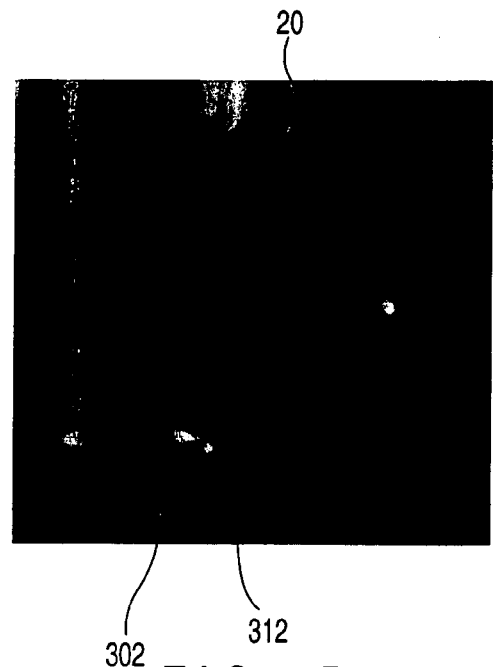

The manufacture of an emulsion was executed under the same conditions as Example 1 of the second embodiment except that a thick blue ink was employed as the third fluid 13 and that the outlet port 312 of the inner circular passage 302 was extended longer than the outlet port 311 of the outer circumferential passage 301 as shown FIGS. 25A and 25B.

As a result, an intermediate body 10 was formed as in the case of Example 1. When the third fluid 13 was further continuously introduced into the second fluid 12, the intermediate body 10 was expanded to form a microspherical body. When this microspherical body was further expanded large enough to reach the releasing stage, the microspherical body was separated from the outlet port 31. As a result, it was possible to form a thick blue ink-enclosed single inner aqueous phase type $W_1/Os/W_2$ emulsion being adhered onto the outer surface of the outer circumferential passage 301. FIG. 25B shows a couple of thick blue ink-enclosed single inner aqueous phase type $W_1/Os/W_2$ emulsions that had been continuously formed by this manufacturing method.

Example 3

The manufacture of a blue ink-enclosed $V/Os/W_2$ emulsion as a multiple-phase particle 20 was performed by using a channel 3 having the same structure as the channel 3 shown in FIG. 22A. More specifically, a stainless steel pipe (inner diameter=130 μm, outer diameter=470 μm) which was cut out at an angle of 90 degrees was prepared as the inner circular passage 302. As for the outer circumferential passage 301, a silicone tube was employed. Thus, a channel of dual passage structure consisting of these inner circular passage 302 and outer circumferential passage 301 was employed.

As for the second fluid 12 containing an emulsifier, a solution of decane containing 5 wt % of monoolein was employed. As for the third fluid 13, air was employed. Other conditions were the same as those of Example 1 shown in FIG. 22A. Under these conditions, it was possible to manufacture a multiple-phase particle 20 of single inner vapor phase type $V/Os/W_2$ emulsion which was excellent in uniformity of particle size.

Incidentally, it should be understood that the present invention is not limited to the aforementioned embodiments and that these embodiments can be variously modified without departing from the spirit or scope of the general inventive concept as defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a multiple-phase particle comprising:

preparing a channel including a first passage and a second passage, and the channel including an outlet port placed in a first fluid;

feeding a second fluid into the first passage of the channel;

feeding a third fluid into the second passage of the channel;

guiding the second fluid and the third fluid to the outlet port alternately by guiding the second fluid from the first passage to the outlet port placed in the third fluid and guiding the third fluid from the second passage to the outlet port to be disrupted by the second fluid to form an alternating flow of the second fluid and the third fluid, at least the outlet port of the channel being made from a material to which the second fluid adheres to due to an affinity to the second fluid;

retaining the second fluid at the outlet port by an effect of the affinity of the second fluid, the second fluid being higher in affinity to the outlet port compared with the first fluid, the second fluid retained at the outlet port acting as a boundary film between the first fluid and the second fluid;

then, introducing a third fluid into the second fluid retained at the outlet port, the third fluid being lower in affinity to the outlet port compared with the second fluid, thereby entrapping the third fluid in the second fluid to form an intermediate body of the multiple-phase particle;

introducing the third fluid into the second fluid retained at the outlet port, the intermediate body expanding to form the multiple-phase particle having a larger diameter than an inner diameter of the outlet port; and then, releasing the multiple-phase particle from the outlet port into the first fluid, resisting to an affinity of the multiple-phase particle to the outlet port.

2. The method according to claim 1, wherein the feeding the second fluid is performed by feeding the second fluid containing an emulsifier.

3. The method according to claim 1, wherein the first passage is an outer passage in the channel, and the second passage is an inner passage in the channel.

4. The method according to claim 1, wherein the first passage is an inner passage in the channel, and the second passage is an outer passage in the channel.

5. The method according to claim 1, wherein the first fluid is a hydrophilic fluid and the feeding the second fluid is performed by feeding a lipophilic second fluid containing at least one emulsifier, the feeding the third fluid is performed by feeding a hydrophilic third fluid to the channel, and the multiple-phase particle is in a form of a single phase type emulsion or in a form of a multiple-phase type emulsion, the emulsion being an inner water phase type or a multiple inner water phase type water-in-oil-in-water (W/O/W) emulsion.

6. The method according to claim 5, wherein the multiple-phase particle is in a form of a vesicle or liposome.

7. The method according to claim 1, wherein the first fluid is a lipophilic fluid and the feeding the second fluid is performed by feeding a hydrophilic second fluid containing at least one emulsifier, the feeding the third fluid is performed by feeding a lipophilic third fluid to the channel, and the multiple-phase particle is in a form of a single phase type emulsion or in a form of a multiple-phase type emulsion, the emulsion being an inner oil phase type or a multiple inner oil phase type oil-in-water-in-oil (O/W/O) emulsion.

8. The method according to claim 7, wherein the multiple-phase particle is in a form of reversed vesicle.

9. The method according to claim 1, wherein the first fluid is a hydrophilic fluid and the feeding the second fluid is performed by feeding the lipophilic second fluid containing at least one emulsifier, the feeding the third fluid is performed by feeding a gas to the channel, and the multiple-phase particle is in a form of a single phase type emulsion or in a form of a multiple-phase type emulsion, the emulsion being an inner vapor phase type or a multiple inner vapor phase type vapor-in-oil-in-water (V/O/W) emulsion.

10. The method according to claim 1, wherein the first fluid is a lipophilic fluid and the feeding the second fluid is performed by feeding a hydrophilic second fluid containing at least one emulsifier, the feeding the third fluid is performed by feeding a gas to the channel, and the multiple-phase particle is in a form of a single phase type emulsion or in a form of a multiple-phase type emulsion, the emulsion being an inner vapor phase type or a multiple inner vapor phase type vapor-in-oil-in-water (V/O/W) emulsion.

11. The method according to claim 1, wherein the forming the multiple-phase particle is performed by adjusting a volume ratio or flow rate between the second fluid being retained at the outlet port in the channel and the third fluid, thereby entrapping the third fluid in the second fluid to form the multiple-phase particle.

12. The method according to claim 1, wherein the first fluid is a continuous-phase consisting of either a mobile phase or a stationary phase.

13. The method according to claim 2, wherein the alternately feeding a segment of the second fluid and a segment of the third fluid to the channel is performed by using the segment of the third liquid at least partially containing at least one substance, and the forming the multiple-phase particle is performed by incorporating at least one substance into at least a portion of the multiple-phase particle.

14. The method according to claim 2, wherein the alternately feeding a segment of the second fluid and a segment of the third fluid to the channel is performed by using the segment of the second fluid at least partially containing at least one substance which is different from that of the third fluid, and the forming the multiple-phase particle is performed by incorporating at least one substance into at least a portion of the multiple-phase particle.

15. The method according to claim 13, wherein the substance is selected from the group consisting of ligand, electron-conjugated molecule, cyclodextrin, micelle containing fluorescent lipid, micelle containing glycolipid, micelle containing protein, reversed micelle containing fluorescent lipid, reversed micelle containing glycolipid, reversed micelle containing protein, aromatic or odorous substances, drug, chemicals, dyestuffs, fluorescent agents, redox agents, peptide, polypeptide, sugar, nucleic acid, nucleic acid-related substances, protein, metallic fine particle, fine particle, dendrimer, carbon nanohone, micelle containing oil-soluble drug, reversed micelle containing water pool-soluble drug or protein, cell, fullerene and liquid crystal.

16. The method according to claim 14, wherein the substance is selected from the group consisting of ligand, electron-conjugated molecule, cyclodextrin, micelle containing fluorescent lipid, micelle containing glycolipid, micelle containing protein, reversed micelle containing fluorescent lipid, reversed micelle containing glycolipid, reversed micelle containing protein, aromatic or odorous substances, drug, chemicals, dyestuffs, fluorescent agents, redox agents, peptide, polypeptide, sugar, nucleic acid, nucleic acid-related substances, protein, metallic fine particle, fine particle, dendrimer, carbon nanohone, micelle containing oil-soluble drug, reversed micelle containing water pool-soluble drug or protein, cell, fullerene and liquid crystal.

17. A method of manufacturing a multiple-phase particle comprising:

preparing a channel including a first passage and a second passage, the channel further including an outlet port 0 placed in a first fluid;

feeding a second fluid into the first passage of the channel;

feeding a third fluid into the second passage of the channel;

guiding the second fluid and the third fluid to the outlet port alternately by guiding the second fluid from the first passage to the outlet port placed in the third fluid and guiding the third fluid from the second passage to the outlet port to be disrupted by the second fluid to form an alternating flow of the second fluid and the third fluid, at least the outlet port of the channel being made from a material to which the second fluid adheres due to an affinity of the second fluid;

retaining the second fluid at the outlet port by an effect of the affinity of the second fluid, the second fluid being higher in affinity to the outlet port compared with the first fluid, the second fluid retained at the outlet port acting as a boundary film between the first fluid and the second fluid;

then, introducing a third fluid into the second fluid retained at the outlet port, the third fluid being lower in affinity to the outlet port compared with the second fluid, thereby entrapping the third fluid in the second fluid to form an intermediate body of the multiple-phase particle, the intermediate body being adhered to the outlet port;

introducing the third fluid into the second fluid retained at the outlet port, the intermediate body expanding to form the multiple-phase particle which is semi-spherical or microspherical and having a larger diameter than inner diameter of the outlet port, the multiple-phase particle adhered to the outlet port being grown into a size which is large enough for releasing; and then, releasing the multiple-phase particle from the outlet port into the first fluid, resisting to the affinity thereof to the outlet port.

* * * * *